United States Patent
Ouchi

(10) Patent No.: US 7,072,085 B2
(45) Date of Patent: Jul. 4, 2006

(54) IMAGE COMBINER AND IMAGE DISPLAY UNIT

(75) Inventor: Yumiko Ouchi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/032,202

(22) Filed: Jan. 10, 2005

(65) Prior Publication Data
US 2005/0141066 A1     Jun. 30, 2005

Related U.S. Application Data

(63) Continuation of application No. PCT/JP03/09430, filed on Jul. 25, 2003.

(30) Foreign Application Priority Data

Jul. 26, 2002    (JP) ................... 2002-218184

(51) Int. Cl.
*G03H 1/00* (2006.01)
(52) U.S. Cl. ........................... 359/13; 359/630
(58) Field of Classification Search ............... 359/13, 359/15, 16, 22, 630; 345/7, 8
See application file for complete search history.

(56) References Cited

U.S. PATENT DOCUMENTS

| | | | |
|---|---|---|---|
| 4,655,540 A | | 4/1987 | Wood et al. |
| 5,089,903 A | * | 2/1992 | Kuwayama et al. ............ 359/15 |
| 5,144,459 A | | 9/1992 | Felske et al. |
| 5,363,220 A | * | 11/1994 | Kuwayama et al. ............ 359/3 |
| 5,680,231 A | * | 10/1997 | Grinberg et al. ............... 359/15 |
| 6,822,770 B1 | * | 11/2004 | Takeyama ..................... 359/13 |
| 2001/0038361 A1 | | 11/2001 | Tanjiri et al. |

FOREIGN PATENT DOCUMENTS

| | | |
|---|---|---|
| EP | 0 216 692 A2 | 4/1987 |
| EP | 0 200 022 A | 11/1988 |
| JP | 11-064781 A | 3/1999 |
| JP | 2000-121989 A | 4/2000 |
| JP | 2000-352689 A | 12/2000 |
| JP | 2001-264682 A | 9/2001 |
| JP | 2002-258488 A | 9/2002 |

* cited by examiner

OTHER PUBLICATIONS

*Related* U.S. Appl. No. 11/043,718, filed Jan. 26, 2005; Inventors: Yuiko Ouchi et al; Title: Image Combiner and Image Display Unit.

*Primary Examiner*—Mark A. Robinson
*Assistant Examiner*—Alessandro Amari
(74) *Attorney, Agent, or Firm*—Frishauf, Holtz, Goodman & Chick, P.C.

(57) ABSTRACT

A plate part is positioned in front of the eye of the user. An image combiner causes light from an image display element to be superimposed on light that is transmitted through the plate part and conducts this light to the eye. The light from the image display element reaches the eye after being diffracted and reflected by a reflective type HOE inside the plate part. The wavelength at which the diffraction efficiency shows a maximum value when the chief rays that are emitted from the center of the display part of the image display element are diffracted and reflected by the reflective type HOE and the wavelength at which the diffraction efficiency shows a maximum value when the chief rays that are emitted from the peripheral portions of the display part in a specified direction are diffracted and reflected by the reflective type HOE are substantially different.

20 Claims, 20 Drawing Sheets

IMAGE COMBINER AND IMAGE DISPLAY UNIT

This is a continuation of PCT International Application No. PCT/JP2003/009430 filed on Jul. 25, 2003, which is hereby incorporated by reference.

TECHNICAL FIELD

The present invention relates to an image combiner which makes it possible for the user to view an image based on light from the front such as the outside world and a display image that is superimposed on this first image, and an image display device such as a head-mounted display using this image combiner.

BACKGROUND ART

In the past, for example, the image display devices disclosed in Japanese Patent Application Kokai No. 2000-352689 and Japanese Patent Application Kokai No. 2001-264682 have been known as so-called see-through type head-mounted image display devices (head-mounted displays) which allow the user to view a display image superimposed on a view of the outside world while observing the conditions of this outside world. Furthermore, Japanese Patent Application Kokai No. 2001-264682 discloses not only a see-through type head-mounted image display device, but also an image display device that is not used as a see-through type device (i.e., that conducts only light from an image display element to the eyes of the user without superimposing other light from the outside world or the like on this light from the image display element) while having substantially the same construction as such a see-through type device; an example in which this image display device is contained in the flipper part of a portable telephone is also disclosed.

In these image display devices, a reduction in size and weight is achieved by using a reflective type holographic optical element. Such a reflective type holographic optical element is superior in terms of wavelength selectivity, and can selectively diffract and reflect only light in an extremely limited wavelength region. Accordingly, in cases where a see-through type image display device is constructed, loss of the amount of light that is transmitted from the outside world or the like by means of a reflective type holographic optical element can be conspicuously reduced.

Furthermore, in these image display devices, the exit pupil of the image combiner is formed so that this pupil substantially coincides with the pupil of the eye of the user in the use state, and a reflective type holographic optical element in these image display devices is manufactured so that the position of one light source (the reference light source) of the two light sources that are used to expose the reflective type holographic optical element during the manufacture of this element is caused to coincide substantially with the position of the exit pupil of the image combiner (paragraph No. 25 of Japanese Patent Application Kokai No. 2000-352689 and paragraph No. 37 of Japanese Patent Application Kokai No. 2001-264682). In these patent applications, the following effect is described: by using a reflective type holographic optical element which is manufactured with the position of the reference light source during manufacture disposed in the position of the pupil of the user, the exposure light during manufacture and the observation light during use substantially coincide, so that the diffraction efficiency of the reflective type holographic optical element during use can be improved to the maximum extent (paragraph No. 25 of Japanese Patent Application Kokai No. 2000-352689 and paragraph No. 37 of Japanese Patent Application Kokai No. 2001-264682).

Furthermore, in these image display devices, a liquid crystal display element is generally used as the image display element in order to achieve a reduction in size and weight, and an LED, which is a compact and inexpensive light source, is used as the light source that illuminates this image display element.

However, in these conventional image display devices, although a good display image can be viewed in cases where the center of the pupil of the eye of the user and the center of the exit pupil of the image combiner coincide, the display screen gradually becomes darker as the center of the pupil of the eye of the user moves from the center toward the periphery of the exit pupil of the image combiner, and the display image appears to be blurred, so that the image quality is not always sufficient. Furthermore, during actual use, it can frequently happen that the center of the pupil of the eye of the user deviates from the center of the exit pupil of the image combiner.

DISCLOSURE OF THE INVENTION

The present invention was devised in the light of such circumstances; it is an object of the present invention to provide an image display device which can improve the image quality of the display image in cases where the center of the pupil of the eye of the user deviates from the center of the exit pupil of the image combiner, while achieving a reduction in size and weight by using a reflective type holographic optical element, and to provide an image combiner that can be used in such an image display device or the like. Furthermore, in the following description, there may be instances in which the holographic optical element is referred to as an "HOE."

It is known that the diffraction characteristics of a reflective type HOE, and especially of a reflective volume type HOE, have a sharp wavelength selectivity and broad angular characteristics. Specifically, diffracted light can be obtained in a specified direction at a maximum efficiency with respect to reproduced light incident at an angle and a wavelength that satisfy the Bragg condition; however, there are characteristics in which the diffraction efficiency drops abruptly when there is a departure from the Bragg condition with respect to the incident wavelength, and on the other hand, there are characteristics in which the diffraction efficiency gradually decreases in cases where the angle of incidence departs from Bragg angle incidence.

As a result of these characteristics, such a reflective type HOE has become known as an element suitable for use in an image combiner that is capable of performing an image display having a wide angle of view without losing the brightness of light from the outside world.

However, this is an argument that is limited solely by the value of the diffraction efficiency in the case of illumination by light of a single wavelength; research has not proceeded as far as the wavelength characteristics of light that is diffracted in cases where illumination is actually performed using illuminating light that has a bandwidth.

The present inventor investigated the diffraction characteristics of a reflective type HOE in a case where the angle of incidence deviates from Bragg angle incidence, and discovered that when the angle of incidence varies, the wavelength that is diffracted at a maximum efficiency varies. Similarly, the inventor also discovered that when the diffracted light from an HOE is observed from different directions, the wavelength at which the diffraction efficiency shows the highest value varies. This point will be described below.

Diffraction by a reflective type HOE shows a maximum diffraction intensity in a direction that conforms to the Bragg conditional formula. The Bragg conditional formula in a reflective type HOE is expressed by Equation (1) and Equation (2) shown below. The intensity of the light that is diffracted in a direction that simultaneously satisfies Equation (1) and Equation (2) below shows a maximum value.

$$1/\lambda_R(\sin\theta_O - \sin\theta_R) = 1/\lambda_C(\sin\theta_I - \sin\theta_C) \quad (1)$$

$$1/\lambda_R(\cos\theta_O - \cos\theta_R) = 1/\lambda_C(\cos\theta_I - \cos\theta_C) \quad (2)$$

Here, the left side in Equation (1) and Equation (2) indicates the state during the manufacture of the reflective type HOE, $\lambda_R$ indicates the exposure wavelength, $\theta_O$ indicates the angle of incidence of the object light during exposure with respect to the normal of the plane of the hologram, and $\theta_R$ indicates the angle of incidence of the reference light during exposure. Furthermore, the right side in Equation (1) and Equation (2) indicates the state during use of the reflective type HOE, $\lambda_C$ indicates the dominant wavelength of diffraction, $\theta_C$ indicates the angle of the line of sight with respect to the normal of the plane of the hologram as measured from the center of the plane of the hologram, and $\theta_I$ indicates the angle of incidence of the illuminating light (corresponding to the line of sight) on the plane of the hologram.

This is shown graphically in simplified model form in FIG. 25. Furthermore, in FIG. 25(b), $P_C$ indicates the position of the center of the pupil of the eye of the user. When ray tracing is performed, the light rays are traced from the position $P_C$; accordingly, the orientation of the light rays in FIG. 25(b) is shown as coinciding with the case of ray tracing; however, the actual orientation of the light rays is the opposite orientation.

Here, if the wavelength $\lambda_C$ which has a diffraction intensity and the angle of incidence $\theta_I$ of the illuminating light are determined from the conditions during the manufacture of the HOE and the angle $\theta_C$ of the line of sight on the basis of Equation (1) and Equation (2), the values shown in Equation (3) and Equation (4) below are obtained.

$$\lambda_C = -[(\sin\theta_O - \sin\theta_R)\sin\theta_C + (\cos\theta_O - \cos\theta_R)\cos\theta_C] \times \quad (3)$$

$$2/[(\sin\theta_O - \sin\theta_R)^2 + (\cos\theta_O - \cos\theta_R)^2] \times \lambda_R$$

$$\theta_I = \arcsin\{\lambda_C/\lambda_R \times (\sin\theta_O - \sin\theta_R)\sin\theta_C\} \quad (4)$$

Here, the intensity of diffracted light in cases where there is a deviation from the Bragg condition is not zero, but rather drops according to the amount of this deviation. The manner in which this intensity drops varies according to the thickness of the phase volume type hologram material and the amount of variation in the refractive index; this intensity drops more abruptly as the thickness increases, or as the amount of variation in the refractive index increases. In other words, the wavelength selectivity becomes sharper, so that the contribution of the diffraction indicated by Equation (2) becomes greater.

In actuality, therefore, the wavelength $\lambda_C$ in Equation (3) is the wavelength at which the diffraction intensity shows a maximum value, and light in a wavelength band having a bandwidth in the vicinity of this wavelength is also diffracted as the diffracted light. Accordingly, $\lambda_C$ in Equation (3), which satisfies the Bragg condition formula, is called the dominant diffraction wavelength.

Here, the behavior of the dominant diffraction wavelength $\lambda_C$ and the angle of incidence $\theta_I$ of the illuminating light corresponding to the line of sight was investigated by varying the angle $\theta_C$ of the line of sight under the following conditions: exposure wavelength $\lambda_R$=476 nm, angle of incidence $\theta_R$ of reference light=30°, angle of incidence $\theta_O$ of object light =150°, reflective type HOE in air. The respective angles were measured in counterclockwise rotation from the positive direction of the normal of the reflective type HOE. The results obtained are shown in Table 1 below. As is seen from Table 1, the dominant diffraction wavelength $\lambda_C$ shifts by approximately ±9 nm when the angle $\theta_C$ of the line of sight varies by ±5 degrees.

TABLE 1

| Angle $\theta_C$ of line of sight (deg) | Dominant diffraction wavelength $\lambda_C$ (nm) | Angle of incidence $\theta_I$ of illuminating light (deg) |
| --- | --- | --- |
| 25 | 484.5 | 155 |
| 30 | 476.0 | 150 |
| 35 | 466.4 | 145 |

Here, when Equation (3) is rewritten as the ratio $\lambda_C/\lambda_R$ of the dominant diffraction wavelength $\lambda_C$ to the exposure wavelength $\lambda_R$ (relative dominant diffraction wavelength), Equation (5) shown below is obtained:

$$\lambda_C/\lambda_R = -[(\sin\theta_O - \sin\theta_R)\sin\theta_C + (\cos\theta_O - \cos\theta_R)\cos\theta_C] \times \quad (5)$$

$$2/[(\sin\theta_O - \sin\theta_R)^2 + (\cos\theta_O - \cos\theta_R)^2]$$

FIG. 26 shows a graph of the variation in the value of the relative dominant diffraction wavelength $\lambda_C/\lambda_R$ indicated in Equation (5) which was obtained in a case where the difference ($\theta_C - \theta_R$) of the angle $\theta_C$ of the line of sight relative to the angle of incidence $\theta_R$ of the reference light during exposure was varied with the angle of the exposure light as a parameter. As is seen from FIG. 26, the value of the relative dominant diffraction wavelength $\lambda_C/\lambda_R$ also departs from 1 as the difference in angles ($\theta_C - \theta_R$) departs from 0. Accordingly, it is seen that the wavelength shift increases as the difference ($\theta_C - \theta_R$) between the angle $\theta_C$ of the line of sight and the angle of incidence $\theta_R$ of the reference light during exposure increases. Furthermore, for convenience of description, this phenomenon is called the "wavelength shift phenomenon."

In the conventional image display devices described above, a reflective type holographic optical element is used which is manufactured with the position of the reference light source used for exposure during manufacture caused to coincide with the position of the exit pupil of the image combiner. Specifically, the position of the reference light source during exposure is defined as the pupil position while the reflective type HOE is used in an end-use system. Accordingly, while the difference between the angle of incidence of the reference light during exposure and the angle of the line of sight is substantially zero at all angles of view for the chief rays while the image combiner is used in the end-use system, a difference is generated between the angle $\theta_C$ of the line of sight and the angle of incidence $\theta_R$ of the reference light for light rays (marginal rays) passing through positions that deviate from the center in the exit pupil of the image combiner. Consequently, a wavelength shift occurs in the marginal rays while the image combiner is used in the end-use system as a result of the wavelength shift phenomenon described above.

Furthermore, in the conventional image display devices described above, it has been ascertained that the reason that the display screen becomes darker as the center of the pupil of the eye of the user moves toward the periphery of the exit pupil of the image combiner from the center of this exit pupil is as follows: the optical intensity at the exit pupil is a combination of the incident light intensity and the diffraction efficiency. Here, the wavelength characteristic of incident light intensity is uniquely decided by a light source.

On the other hand, the wavelength characteristic of diffraction efficiency changes depending on the position in the exit pupil because of the wavelength shift phenomenon as described above. Therefore, in the periphery of the pupil, the intensity decreases according to the wavelength characteristic of incident light intensity. Moreover, it has been ascertained that the reason that the image appears to be blurred is that since the diffraction wavelength varies as the periphery of the pupil is approached, a lateral chromatic aberration is generated.

For the image display devices of several embodiments described in Japanese Patent Application Kokai No. 2000-352689 and Japanese Patent Application Kokai No. 2001-264682, the present inventor concretely determined the variation in the diffraction wavelength described above and the resulting amount of lateral chromatic aberration by performing ray tracing toward the image display element (image forming member such as a liquid crystal display element) from the pupil of the observer (user). The results obtained will be described below.

In the case of Embodiment 3 described in Japanese Patent Application Kokai No. 2000-352689, a reflective type holographic optical element is used which is manufactured with the position of the reference light source used for exposure during manufacture and the position of the exit pupil of the image combiner caused to coincide. Accordingly, the Bragg condition is satisfied with respect to the chief rays, i.e., light rays directed toward various points of the image plane from the center of the pupil. Consequently, light at the same wavelength (532 nm) as the exposure wavelength is reflected and diffracted at a high diffraction efficiency over all angles of view; however, the diffraction efficiency of light rays that are incident from the pupil coordinate y=1.5 (the y-axis is taken in the upward direction in the plane of the page) shows a maximum value at 527 nm. Conversely, the diffraction efficiency of light rays that are incident from the position of the pupil coordinate y=−1.5 shows a maximum value at 537 nm. In other words, it is seen that the diffraction wavelength shifts by ±5 nm as the periphery of the pupil is approached. Here, the pupil coordinates refer to positional coordinates within the plane of the pupil; the center of the pupil is taken as the origin, and the units are set as millimeters.

Here, in cases where a green LED which has an emission peak in the vicinity of 532 nm is used as the illuminating light source, if the emission characteristics are set at (for example) approximately 20 nm in terms of the full width at half maximum, the emission intensity at 527 nm is 0.5, and the emission intensity at 537 nm is 0.5, where the emission intensity at 532 nm is taken as 1.

Accordingly, at positions where the pupil coordinate y=+1.5, even if the diffraction efficiency of the reflective type HOE is a high efficiency of 90% or greater, the intensity of the illuminating light is 0.5 compared to the center since the diffraction wavelength is shifted by ±5 nm; as a result, the observed image becomes darker.

Furthermore, if the lateral chromatic aberration is calculated, then, relative to the y coordinate y=0.0 on the image plane of light rays that are incident at an angle of view of 0° from the center of the pupil at a wavelength of 532 nm, the height on the image plane of light rays that are incident from a pupil coordinate y=1.5 at a wavelength of 527 nm is y=−0.10, and the height on the image plane of light rays that are incident from a pupil coordinate y=−1.5 at a wavelength of 537 nm is y=0.12, so that a lateral chromatic aberration of 0.1 mm or greater is generated.

Assuming that a ¼ inch (4.8×3.6 mm) QVGA (320×240 pixels) liquid crystal display device is placed on the image plane, i.e., the surface of the image forming member, then the size of one pixel is 0.015 mm square, and the chromatic aberration of magnification described above has a large value corresponding to 7 to 8 pixels.

Specifically, as a result of the chromatic aberration arising from this wavelength shift, the image appears to be blurred as the periphery of the pupil is approached.

The present inventor conducted further research based on the results obtained in an elucidation of the causes of the problems encountered in such a conventional image display device, and investigated the use of a reflective type HOE manufactured with the position of the reference light source during exposure moved to the position of the virtual image made by the end-use system (this position is ordinarily a position that is separated from the exit pupil of the image combiner by a distance of 1 m to infinity) instead of a reflective type HOE manufactured with the position of the reference light source during exposure and the position of the pupil while the reflective type HOE is used in the end-use system set at the same position.

When a reflective type HOE is used which is manufactured with the position of the reference light source during exposure moved to the position of the virtual image made by the end-use system, as long as the light rays have the same angle of view, the difference $(\theta_C-\theta_R)$ between the angle $\theta_C$ of the line of sight and the angle of incidence $\theta_R$ of the reference light is smaller than in a conventional device, even for light rays passing through any position within the exit pupil of the image combiner, regardless of whether these light rays are chief rays or marginal rays.

Accordingly, the intensity distribution in the ray bundle section, which is constituted from light rays, becomes uniform. And the dominant diffraction wavelength about the rays at the center of the angle of view is substantially equal to the exposure wavelength.

Accordingly, even if the center of the pupil of the eye of the user deviates from the center of the exit pupil of the image combiner, darkening of the display image and apparent blurring of the display image are eliminated, so that the image quality in cases where the center of the pupil of the eye of the user deviates from the center of the exit pupil of the image combiner is greatly improved compared to the case of the conventional image display devices described above. Consequently, the convenience of the device for the user is greatly improved.

Where: [i] the wavelength at which the diffraction efficiency in a case where the light passes through a specified position after being emitted from the center of the display part of the image display means and diffracted by the reflective type holographic optical element shows a maximum value in the respective wavelength regions described above is designated as $\lambda_o$, [ii] the wavelength at which the diffraction efficiency of the light that passes through the same position as the specified position mentioned above after being emitted from the peripheral portions of the display part of the image display means and diffracted by the reflective type holographic optical element shows a maximum value in the respective wavelength regions is designated as $\lambda_y$, and [iii] the wavelength at which the diffraction efficiency of the light that is propagated at a different position from the specified position after being emitted from the center of the display part of the image display means and diffracted by the reflective type holographic optical element and in which the direction of sight with respect to the reflective type holographic optical element is the same direction as the direction of propagation of the light that passes through the specified position after being emitted from the center of the display part and diffracted by the reflective type holographic optical element shows a maximum value in the respective wavelength regions is designated as $\lambda_z$, the present invention is devised so that substantially the same image quality can be obtained even if the position of the pupil of the eye of the user should vary within the plane of the exit pupil, by setting $\lambda_o$ and $\lambda_z$ at substantially the same wavelength. Consequently, since the conditions are such that the emission angles of the light following diffraction differ from each other, $\lambda_y$ and $\lambda_o$ show different values.

Accordingly, in the case of a reflective type HOE manufactured with the position of the reference light source during exposure moved to a position that is shifted from the position of the pupil while the reflective HOE is used in the end-use system toward the position of the virtual image made by the end-use system, if the wavelength $\lambda_o$ and wavelength $\lambda_y$ are set so that these wavelengths are different, there is no deterioration in the image quality even in cases where the center of the pupil of the eye of the user deviates from the center of the exit pupil of the image combiner.

Here, if it is desired to achieve a certain degree of improvement in the image quality in cases where the center of the pupil of the eye of the user deviates from the center of the exit pupil of the image combiner, it is desirable that either Equation (6) or Equation (7) shown below be satisfied.

$$1.013 < \lambda_y/\lambda_o \quad (6)$$

$$\lambda_y/\lambda_o < 0.98 \quad (7)$$

Furthermore, if the amount of the wavelength shift caused by the angle of view with respect to the emission spectrum width of the illuminating light source is excessively large, there is a danger that a drop in the quantity of light will occur in portions located within the screen. Accordingly, in order to prevent this, it is desirable that the emission spectrum width of the illuminating light source and the wavelength shift caused by the angle of view be taken into consideration, and that the amount of the wavelength shift be controlled by causing the reference light source to approach the vicinity of the pupil from the vicinity of the virtual image in cases where the emission spectrum width is narrow. In concrete terms, in cases where the light that is emitted from the image display means has only a single wavelength region component or a plurality of discrete wavelength region components, it is desirable that Equation (8) shown below be satisfied when the full width at half maximum in the single wavelength region or the full width at half maximum of one of the plurality of wavelength regions is set as FWHM.

$$0.2 < |(\lambda_y - \lambda_o)/\text{FWHM}| \quad (8)$$

Furthermore, the "0.2" on the left side of Equation (8) is based on the results obtained by giving consideration so that the spectra of the half bandwidths of the respective wavelength regions are also included in the full width at half maximum of the spectrum of the light source, as a result of taking into account the half bandwidth of the spectrum of the diffraction wavelength region centered on the wavelength $\lambda_y$, and the half bandwidth of the spectrum of the diffraction wavelength region centered on the wavelength $\lambda_o$.

The above was an investigation of the distance of the reference light source. However, the present inventor also investigated the angle of incidence of the reference light source, and obtained the following results. Specifically, by appropriately setting the angle of incidence of the reference light source, it is possible to correct the deviation of the wavelengths of the exposure light source and illuminating light source, so that the brightness center is always caused to coincide with the screen center.

It is desirable that the wavelength of the exposure light source and the wavelength of the illuminating light source coincide; ordinarily, however, since a laser is used as the exposure light source and an LED is used as the illuminating light source, and since the light generating means are different in a laser and an LED, the wavelengths of the two light sources do not always coincide. Accordingly, in cases where there is some deviation, it was found that the reduction in light at the ends of the angle of view can be balanced by adjusting the angle of the reference light source so that the dominant diffraction wavelength at the center of the angle of view and the dominant wavelength of the illuminating light source are caused to coincide.

With regard to the method used, the characteristic of the wavelength shift caused by the angular difference between the reference light and the incident light in the end-use system can be positively used, and the angle of incidence of the reference light source can be shifted from that described above so that the dominant diffraction wavelength of the light rays at the center of the angle of view coincides with the dominant wavelength of the illuminating light source instead of the exposure wavelength, thus shifting the dominant diffraction wavelength of the light rays at the center of the angle of view of the end-use system from the exposure wavelength. The amount can be calculated in reverse from Equations (3) and (4) described above. Specifically, the difference in the angle of incidence can be calculated so that the dominant diffraction wavelength coincides with the dominant wavelength of the illuminating light source.

In concrete terms, if the angle of incidence (angle calculated in air) on the center of the reflective type holographic optical element from the light source located on the side of the eye of the observer while the image combiner is used in the end-use system (of the two light sources used to expose the reflective type holographic optical element during manufacture) is designated as $\theta 1$, and the angle of reflection (angle calculated in air) at the reflective type holographic optical element of the light rays that are emitted from the center of the display part of the image display means and directed toward the center of the exit pupil of the image combiner is designated as $\theta 2$, then the reduction in light at the ends of the angle of view can be balanced in a state close to the center distribution if Equation (9) shown below is satisfied.

$$0.80 < |\theta 1 - \theta 2| \quad (9)$$

As was described above, the present invention can provide an image display device which is capable of achieving an improvement in the image quality of the display image in cases where the center of the pupil of the eye of the user deviates from the center of the exit pupil of the image combiner while achieving a reduction in size and weight by using a reflective type holographic optical element, and can also provide an image combiner that can be used in such an image display device or the like.

BRIEF DESCRIPTION OF THE DRAWINGS

FIG. 4(*a*) shows an angle of view of (X, Y)=(6.75°, +5°), FIG. 4(*b*) shows an angle of view of (X, Y)=(6.75°, 0°), and FIG. 4(*c*) shows an angle of view of (X, Y)=(6.75°, −5°). The left side of each figure shows the lateral aberration in the direction of the Y axis, and the right side of each figure shows the lateral aberration in the direction of the X axis. Furthermore, the solid lines indicate light with a wavelength of 499.59 nm, the broken lines indicate light with a wavelength of 509.59 nm, and the one-dot chain lines indicate light with a wavelength of 519.2 nm.

FIG. 11(*a*) shows an angle of view of (X, Y)=(6.75°, +5°), FIG. 11(*b*) shows an angle of view of (X, Y)=(6.75°, 0°), and FIG. 11(*c*) shows an angle of view of (X, Y)=(6.75°, −5°). The left side of each figure shows the lateral aberration in the direction of the Y axis, and the right side of each figure shows the lateral aberration in the direction of the X axis. Furthermore, the solid lines indicate light with a wavelength of 453.38 nm, the broken lines indicate light with a wavelength of 463.38 nm, and the one-dot chain lines indicate light with a wavelength of 443.38 nm.

FIG. 18(*a*) shows an angle of view of (X, Y)=(6.75°, +5°), FIG. 18(*b*) shows an angle of view of (X, Y)=(6.75°, 0°), and FIG. 18(*c*) shows an angle of view of (X, Y)=(6.75 °, −5°). The left side of each figure shows the lateral aberration in the direction of the Y axis, and the right side of each figure shows the lateral aberration in the direction of the X axis. Furthermore, the solid lines indicate light with a wavelength of 641.16 nm, the broken lines indicate light with a wavelength of 651.16 nm, and the one-dot chain lines indicate light with a wavelength of 631.16 nm.

FIG. 25(a) shows the state during exposure of the hologram, and FIG. 25(b) shows the state during use of the hologram.

BEST MODE FOR CARRYING OUT THE INVENTION

Image combiners and image display devices constituting working configurations of the present invention will be described below with reference to the figures.

[First Working Configuration]

Figure 1:
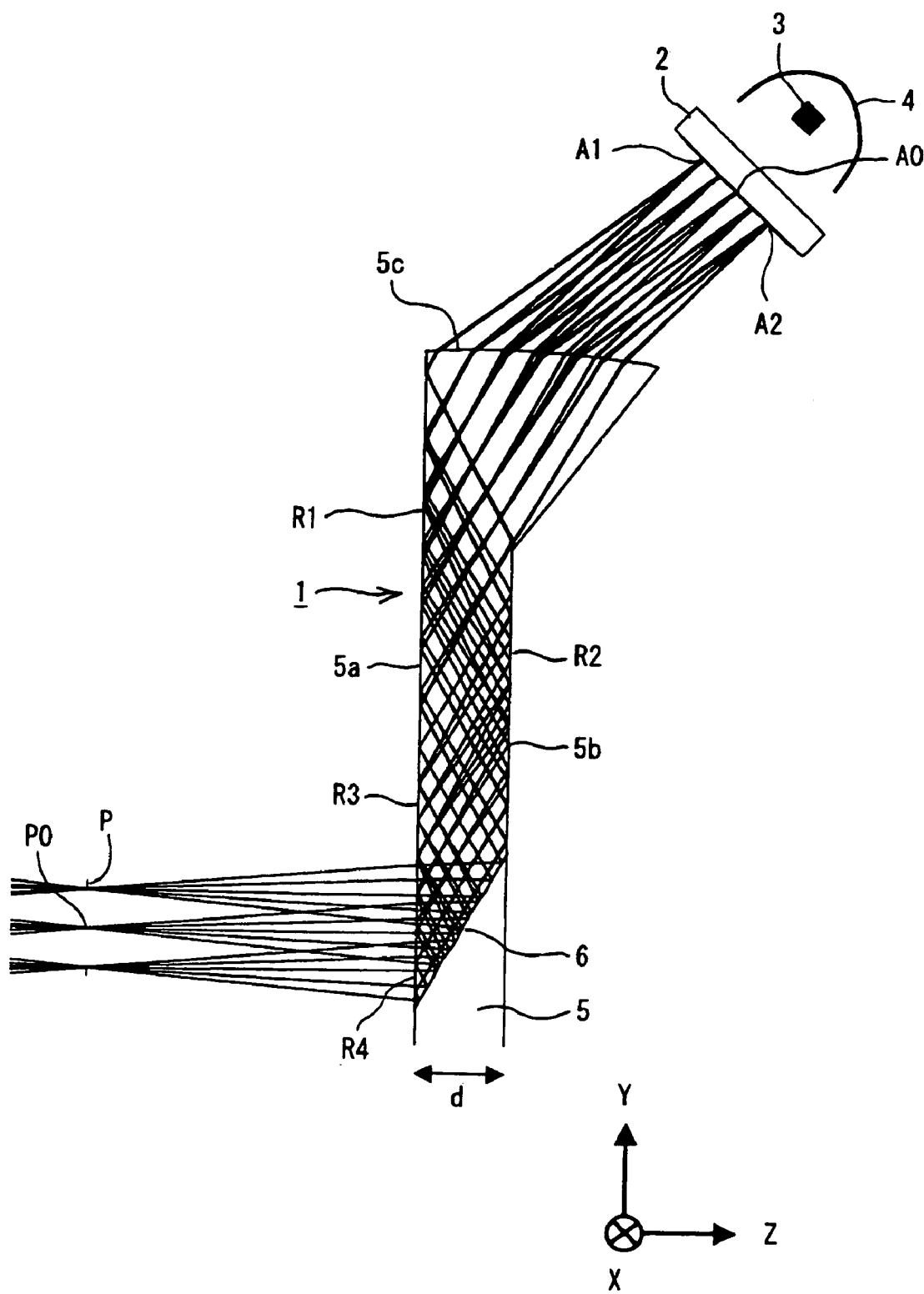
FIG. 1 is a diagram which shows the construction of an image display device constituting a first working configuration of the present invention, and (in schematic terms) the path of the light rays in this image display device.

FIG. 1 is a diagram which shows the construction of an image display device constituting a first working configuration of the present invention, and (in schematic terms) the path of the light rays (only the light rays from the image display element 2) in this image display device.

Here, an X-axis, a Y-axis and a Z-axis that are mutually perpendicular are defined as shown in FIG. 1. Specifically, the left-right direction in the plane of the page in FIG. 1 is taken as the Z axis, and the direction in which the Z coordinate value increases is defined as "right." The vertical direction in the plane of the page in FIG. 1 is taken as the Y axis, and the direction in which the Y coordinate value increases is defined as "up." The direction perpendicular to the plane of the page in FIG. 1 is taken as the X axis, and the system is a right-handed system, i.e., the inward direction from the plane of the page in FIG. 1 is defined as the direction in which the X coordinate value increases. Furthermore, the Y-axis direction may also be caused to coincide with the actual vertical direction, or may be some other appropriate direction. These definitions are also the same for FIGS. 9 and 16 described later.

The image display device constituting the present working configuration comprises an image combiner 1 and an image display element 2.

In the present working configuration, a transmitting type LCD is used as the image display element 2. The image display element 2 is illuminated from the back with light source light from a light source consisting of an LED 3 and a reflective mirror 4 such as a parabolic mirror. The light source light is subjected to spatial light modulation, and light indicating the display image is transmitted. Furthermore, it goes without saying that it would also be possible to use some other element such as a reflective type LCD, or to use an electroluminescent light emitting element, as the image display element 2.

Figure 27:
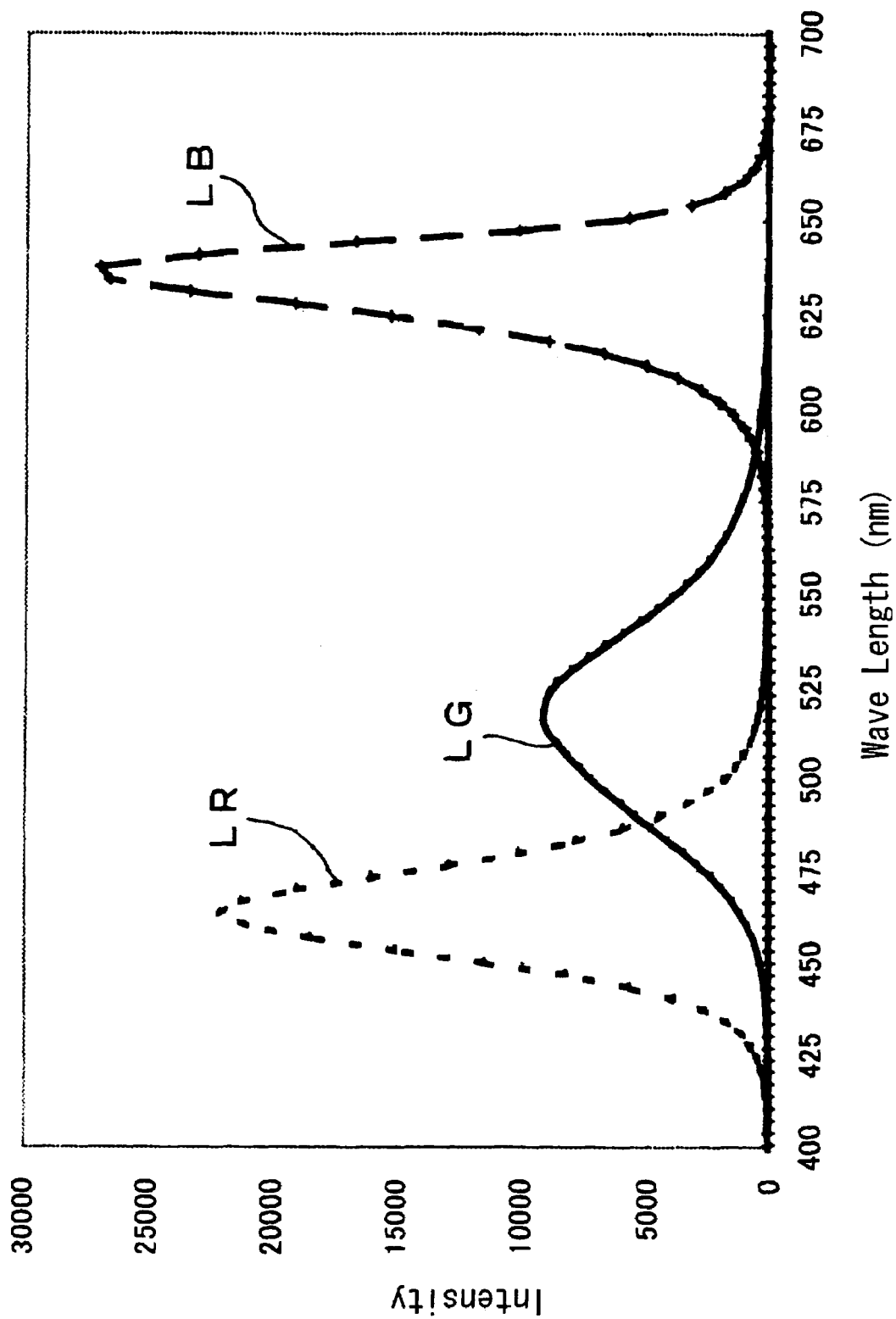
FIG. 27 is a diagram which shows the wavelength characteristics of the illuminating light source in the image display devices of the first through fourth working configurations of the present invention.

In the present working configuration, a three-color LED is used as the LED 3. FIG. 27 shows the emission spectrum of the LED 3. In FIG. 27, the line LR indicates the emission spectrum of the red light emitting part of the LED 3, the line LG indicates the emission spectrum of the green light emitting part of the LED 3, and the line LB indicates the emission spectrum of the blue light emitting part of the LED 3. As is seen from FIG. 27, the light emitted by the LED 3 has respective peak wavelengths in the R (red) wavelength region, G (green) wavelength region and B (blue) wavelength region, and has respective intensities in the respective wavelength regions extending before and after the respective peak wavelengths. The full width at half maximum $FWHM_r$ of the spectral intensity for the peak wavelength in the R wavelength region of this LED 3 is 23 nm, the full width at half maximum $FWHM_g$ for the peak wavelength in the G wavelength region is 60.8 nm, and the full width at half maximum $FWHM_b$ for the peak wavelength in the B wavelength region is 29 nm. These points are also the same in the respective working configurations described later.

Furthermore, in the present working configuration, the device is constructed so that the reflective type HOE 6 selectively diffracts and reflects only the G wavelength band component; accordingly, a single-color LED for G which emits only the G wavelength region component in FIG. 27 may also be used as the LED 3.

The image combiner 1 comprises a plate-form part 5 which is constructed in the form of parallel flat plates with the upper portions removed from an optical material such as glass or plastic. Of course, the plate-form part 5 may also have (for example) an optical power that is used to correct the visual acuity of the user. In this case, for example, at least one surface of the two surfaces 5a and 5b of the plate-form part 5 in the direction of the Z-axis is constructed as a curved surface. These points are also the same in the respective working configurations described later. Furthermore, in the present working configuration, the upper portion of the plate-form part 5 protrudes to the right in the figure, and the upper surface 5c of this upper portion is formed as an anamorphic non-spherical surface. Moreover, the plate-form part 5 also extends downward in FIG. 1; however, this is omitted from the figure.

The plate-form part 5 is mounted on the head of the user via a supporting member such as a frame (not shown in the figure) in the same manner as a spectacle lens, and is positioned in front of the eye (not shown in the figure) of the user. In FIG. 1, P indicates an exit pupil for light from the image display element 2 of the image combiner 1, and P0 indicates the center of the exit pupil P. The image combiner 1 is mounted on the user so that this exit pupil P substantially coincides with the pupil of the eye of the user. In FIG. 1, the Z-axis direction coincides with the direction of thickness of the plate-form part 5. The eye-side surface 5a and opposite-side surface 5b of the plate-form part 5 are parallel to the XY plane. Furthermore, although this is not shown in the figure, the LED 3, reflective mirror 4 and image display element 2 are also supported by the supporting member mentioned above. As a result, the image display element 2 is disposed in a position located above and to the right of the plate-form part 5 within the plane of the page in the figure, so that the observation of the outside world by the user is not impeded, and so that the image display element does not create any hindrance when the user mounts the image display device.

Of course, it would also be possible to dispose the image display element 2 in some other appropriate place, and to conduct the display image to the position of the image display element 2 in FIG. 1 by means of a relay optical system; furthermore, it would also be possible to form an image in this position using a scanning optical system. These points are also the same in the respective working configurations described later.

Moreover, in FIG. 1, the points A1 and A2 respectively indicate the positions of both ends of the display part of the image display element 2 within the plane of the page in the figure. Furthermore, the point A0 indicates the center of this display part.

The image combiner 1 is constructed so that the light from the image display element 2 is superimposed on the light (hereafter referred to as "outside world light") that is transmitted through the plate-form part 5 so as to pass through the thickness d of the plate-form part 5 from the front of the plate-form part 5 (i.e., so as to be incident from the surface 5b and emitted from the surface 5a), and is then conducted to the eye of the user.

In the present working configuration, a reflective type holographic optical element (reflective type HOE) 6 is disposed inside the plate-form part 5 in the vicinity of the position that faces the eye of the user in the plate-form part 5. In the present working configuration, the reflective type HOE 6 is inclined at a specified angle with respect to the surfaces 5a and 5b as shown in FIG. 1.

For example, the reflective type HOE 6 can be manufactured by being bonded to a small piece of the same material as that of the plate-form part 5; then, this small piece can be placed in the mold frame that forms the plate-form part 5, and the reflective type HOE 6 can be installed inside the plate-form part 5 by pouring the material of the plate-form part 5 in a molten state into the mold frame, and then solidifying this material.

In the present working configuration, the reflective type HOE 6 selectively reflects only the light of the component contained in the G wavelength band shown in FIG. 27 (among the light from the image display element 2). On the other hand, the reflective type HOE 6 transmits the light of almost all wavelength regions of the outside world light (not shown in the figures) without deflecting this light. Furthermore, it is desirable that an HOE with high wavelength selectivity be used as the reflective type HOE 6 so that interference with the outside world light is minimized.

As is shown in FIG. 1, the reflective type HOE 6 has characteristics that selectively reflect only light of the component contained in the G wavelength band shown in FIG. 27 (among the light from the image display element 2) toward the pupil of the observer, and also has an optical power so that this HOE has a specified image focusing action. The reflective type HOE 6 may have a flat surface, or may have a curved surface. In cases where an HOE with a curved surface is used as the reflective type HOE 6, if the center of curvature of the curved surface is disposed on the side of the eye of the user, then the amount of aberration fluctuation according to the angle of view that is generated by the reflective type HOE 6 when the angle of view is large is reduced, which is desirable.

For example, photo-polymers, photo-resists, photochromic materials, photodichromic materials, silver salt emulsions, gelatin bichromate, gelatin dichromate, plastics, ferroelectric materials, magnetic optical materials, electro-optical materials, amorphous semiconductors, photorefractive materials, and the like can be used as the hologram photosensitive material that is used to construct the reflective type HOE 6. Furthermore, the reflective type HOE 6 can be manufactured by simultaneously illuminating such a material with light from two light sources using an optical system that is used for such manufacture according to publicly known methods.

The light that passes through an arbitrary point on the display part of the image display element 2 enters the interior of the plate-form part 5 from the upper surface 5c of the upper part of the plate-form part 5, and is then incident on the region R1 of the surface 5a of the plate-form part 5 at an angle of incidence that is greater than the critical angle, so that this light is totally reflected by the region R1. This light is then incident on the region R2 of the surface 5b of the plate-form part 5 at an angle of incidence that is greater than the critical angle, so that this light is totally reflected by the region R2. Furthermore, this light is then incident on the region R3 of the surface 5a of the plate-form part 5 at an angle of incidence that is greater than the critical angle, so that the light is totally reflected by the region R3. Then, the light is incident on the reflective type HOE 6. In this case, this light is subjected to a reflective and diffractive effect that has wavelength selectivity (G light selectivity in the present working configuration), and an image focusing effect, by the reflective type HOE 6. Subsequently, this light is emitted to the outside of the plate-form part 5 from the region R4 of the surface 5a of the plate-form part 5. In this case, the light leaving the same location on the image display element 2 is incident on the pupil of the eye of the user, which is placed on the exit pupil P so that an enlarged virtual image is formed at a specified distance from the exit pupil P (1 m in the case of the present working configuration; this distance is also the same in the other working configurations described later, and may also be set, for example, at infinity).

The light that reaches the eye of the user after being emitted from the image display element 2 and diffracted and reflected by the reflective type HOE 6 has only a G light component in accordance with the emission spectrum characteristics of the LED 3 and the wavelength selectivity of the reflective type HOE 6. Here, the light rays that are emitted from an arbitrary point on the image display element 2 and that reach the center P0 of the exit pupil P (among the G light that reaches the eye of the user after being emitted from the image display element 2 and diffracted and reflected by the reflective type HOE (i.e., the light of the G wavelength region in FIG. 27)) are called the chief rays with respect to the G wavelength region.

In the present working configuration, if the wavelength at which the diffraction efficiency shows a maximum value when the chief rays with respect to the G wavelength region that are emitted from the center of the display part of the image display element 2 are diffracted and reflected by the reflective type HOE 6 is designated as $\lambda_{og}$, and if the wavelength at which the diffraction efficiency shows a maximum value when the chief rays with respect to the G wavelength region that are emitted from the peripheral portions of the display part of the image display element 2 in the Y direction in FIG. 1 are diffracted and reflected by the reflective type HOE 6 is designated as $\lambda_{yg}$, then either Equation (10) or Equation (11) shown below is satisfied. Accordingly, in the present working configuration, as will be understood from the content already described, the image quality in cases where the center of the pupil of the eye of the user deviates from the center of the exit pupil of the image combiner can be improved.

$$1.013 < \lambda_{yg}/\lambda_{og} \quad (10)$$

$$\lambda_{yg}/\lambda_{og} < 0.98 \quad (11)$$

Furthermore, in the present working configuration, Equation (12) shown below is satisfied. Accordingly, in the present working configuration, as will be understood from the content already described, the amount of the wavelength shift caused by the angle of view with respect to the G wavelength region width of the emission spectrum of the LED 3 is suppressed, so that the danger that a drop in the amount of light will occur in portions of the screen is eliminated.

$$0.2 < |(\lambda_{yg} - \lambda_{og})/\text{FWHMg}| \quad (12)$$

Furthermore, in the present working configuration, if the angle of incidence (angle calculated in air) on the center of the reflective type HOE 6 from the light source located on the side of the eye of the observer while the image combiner is used in the end-use system (of the two light sources used to expose the reflective type HOE 6 (corresponding the G wavelength region) during manufacture) is designated as $\theta 1g$, and if the angle of reflection (angle calculated in air) at the reflective type holographic optical element of the light rays that are emitted from the center of the display part of the image display element 2 and that are directed toward the center P0 of the exit pupil P is designated as $\theta 2$, then Equation (13) shown below is satisfied. Accordingly, in the present working configuration, as will be understood from the content already described, the reduction in light at the ends of the angle of view can be balanced in a state that is close to the center distribution.

$$0.8° < |\theta 1g - \theta 2| \quad (13)$$

Here, a concrete example of the first working configuration will be described with reference to FIG. 1. In the design of this concrete example, Code V (commercial name) manufactured by the U.S. firm of Optical Research Associates, which is well known in this technical field, was used as the design program. In this case, the path of the light rays emitted from the center A0 of the display part of the image display element 2 and passing through the center P0 of the exit pupil P is defined as the optical axis of this optical device as a whole. In this concrete example, the optical axis is not a single straight line, but rather has a shape in which mutually inclined line segments are connected. These points are also the same in the concrete examples of respective working configurations described later.

The various optical quantities of this concrete example are as described below.

The diameter of the exit pupil P is 3 mm. The visual field angle in the upward direction within the plane of the page in the figure is 5°. The visual field angle in the downward direction within the plane of the page in the figure is −5°. The visual field angle in the direction of depth of the page is ±6.75°. The screen size in the plane of the page in the figure (i.e., the length between the point A1 and the point A2) is 3.6 mm. The screen size in the direction of depth of the page is 4.8 mm. The thickness d of the plate-form part 5 is 3.5 mm. The wavelength used is the wavelength width from approximately 480 nm to approximately 540 nm. The refractive index nd of the plate-form part 5 with respect to a wavelength of 587.56 nm (d line) is 1.596229, and the Abbe number vd is 40.4.

Figure 2:
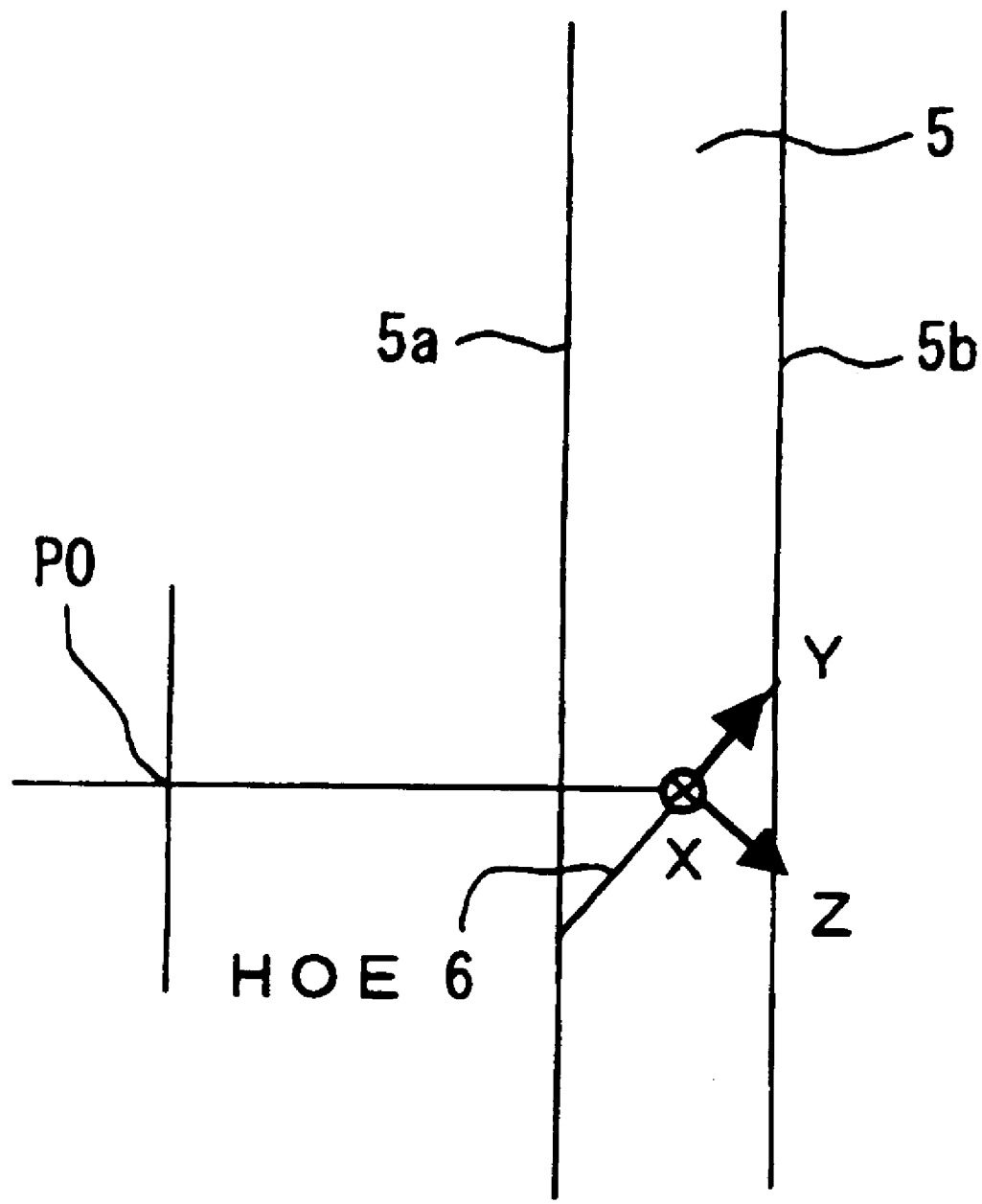
FIG. 2 is a diagram which shows the coordinate system of the two light sources that define the hologram.

With regard to the definition of the HOE 6, the hologram is definitively defined by defining the two light beams that are used for exposure. The two light beams are defined by the positions of the respective light sources and either the convergence (VIR) or divergence (REA) of the beams emitted from the respective light sources. The coordinates of the first point light source (HV1) are designated as (HX1, HY1, HZ1), and the coordinates of the second point light source are designated as (HX2, HY2, HZ2). In the case of these coordinates, as is shown in FIG. 2, the point of intersection between the HOE plane and the optical axis is taken as the origin, the Z-axis is taken in the direction of the optical axis, the upward direction in the plane of the page within the HOE plane is taken as the Y axis, and the direction of depth of the page is taken as the X axis, so that these coordinates are different from the coordinates defined in connection with FIG. 1.

Furthermore, an emulsion with a thickness of 20 μm, a refractive index of 1.493 and a refractive index modulation of 0.03 is used as the emulsion that records the hologram. The exposure wavelength is 532 nm, and it is assumed that the shrinkage rate of the emulsion is 3.3%. Since the fluctuation in the center wavelength caused by shrinkage is in a proportional relationship in the end-use system, the wavelength is also shortened by 3.3%, so that the center wavelength while the image combiner is used in the end-use system is 512 nm. The plane of the HOE 6 is a plane whose center is located 1.7 mm to the right along the Z-axis in FIG. 1 from the surface 5a, and whose orientation is rotated 30° in the clockwise direction on the plane of the page from the same direction as the Y axis. The HOE 6 has a phase function component in order to optimize the image focusing performance.

To describe the phase function here, the phase function is a function that defines the amount of non-spherical phase conversion other than that defined by the two pure point light sources of the HOE 6; in the optical design program Code V, this can be designated using polynomial coefficients of the X- and Y-axis components or the like.

Furthermore, the various quantities used for ray tracing in this concrete example are shown in Table 2 below. The order of the optical planes (order of the plane numbers) runs from the plane of the pupil of the eye of the user (=plane of the exit pupil P of the image combiner 1) to the image display element 2. Furthermore, in Table 2, the reference symbols in FIG. 1 corresponding to the respective plane numbers are indicated as "symbols" in parentheses. This point is also the same in tables described later.

TABLE 2

| Plane number (symbol) | Curvature radius | Medium nd | vd | |
|---|---|---|---|---|
| 1 (P) | INFINITY | | | |
| 2 (5a:R4) | INFINITY | 1.596229 | 40.4 | |
| 3 (6) | INFINITY | 1.596229 | 40.4 | Reflective plane |

| Hologram plane: Definition of two light beams | |
|---|---|
| HV1: VIR | HV2: VIR |
| HX1: $0.000000 \times 10^{+00}$ | HY1: $0.214385 \times 10^{+08}$ HZ1: $0.155769 \times 10^{+08}$ |
| HX2: $0.000000 \times 10^{+00}$ | HY2: $0.181933 \times 10^{+06}$ HZ2: $-.516363 \times 10^{+06}$ |

TABLE 2-continued

Phase coefficient

| | | | | | |
|---|---|---|---|---|---|
| C2: | 4.7919 × 10⁻⁰¹ | C3: | −1.5313 × 10⁻⁰² | C5: | −8.5586 × 10⁻⁰³ |
| C7: | 4.4199 × 10⁻⁰⁴ | C9: | 3.8390 × 10⁻⁰⁴ | C10: | 5.6408 × 10⁻⁰⁶ |
| C12: | 1.2235 × 10⁻⁰⁴ | C14: | 4.7278 × 10⁻⁰⁵ | C16: | −1.3514 × 10⁻⁰⁵ |
| C18: | 3.5083 × 10⁻⁰⁵ | C20: | 9.7776 × 10⁻⁰⁶ | C21: | 3.5859 × 10⁻⁰⁷ |
| C23: | −3.8342 × 10⁻⁰⁶ | C25: | −7.3404 × 10⁻⁰⁷ | C27: | −3.3707 × 10⁻⁰⁶ |
| C29: | 7.5311 × 10⁻⁰⁷ | C31: | −3.7364 × 10⁻⁰⁶ | C33: | −2.6324 × 10⁻⁰⁶ |
| C35: | −1.0178 × 10⁻⁰⁶ | C36: | 6.7531 × 10⁻⁰⁸ | C38: | 4.8718 × 10⁻⁰⁷ |
| C40: | 3.5228 × 10⁻⁰⁷ | C42: | 3.1571 × 10⁻⁰⁸ | C44: | 3.5833 × 10⁻⁰⁷ |
| C46: | −2.8708 × 10⁻⁰⁹ | C48: | 1.8285 × 10⁻⁰⁷ | C50: | 2.1392 × 10⁻⁰⁷ |
| C52: | 8.7363 × 10⁻⁰⁸ | C54: | 4.4404 × 10⁻⁰⁸ | C55: | 5.1216 × 10⁻¹⁰ |
| C57: | −5.0692 × 10⁻⁰⁹ | C59: | −2.8768 × 10⁻⁰⁸ | C61: | −1.8789 × 10⁻⁰⁸ |
| C63: | 6.2577 × 10⁻⁰⁹ | C65: | −1.4146 × 10⁻⁰⁸ | | |

| | | | | |
|---|---|---|---|---|
| 4 (5a:R3) | INFINITY | 1.596229 | 40.4 | Reflective plane |
| 5 (5b:R2) | INFINITY | 1.596229 | 40.4 | Reflective plane |
| 6 (5a:R1) | INFINITY | 1.596229 | 40.4 | Reflective plane |
| 7 (5c) | −40.57208 | | | |

Anamorphic non-spherical surface

KY: 0.000000     KX: 0.000000

Curvature radius in X direction: −20.63634

| | | | | | |
|---|---|---|---|---|---|
| AR: | 0.979301 × 10⁻⁰⁵ | BR: | −.785589 × 10⁻⁰⁶ | CR: | −.561534 × 10⁻⁰⁸ |
| DR: | 0.690209 × 10³⁸ | | | | |
| AP: | −.245366 × 10⁺⁰¹ | BP: | −.272167 × 10⁺⁰⁰ | CP: | −.123202 × 10⁺⁰¹ |
| DP: | 0.211276 × 10⁺⁰⁶ | | | | |

| | |
|---|---|
| 8 (2) | INFINITY |

The definition of the phase function used in Table 2 expresses the optical path difference to which the light rays incident on a point designating the HOE as a position on the XY coordinate plane are subjected as a value that is normalized by the wavelength used; if m and n are assumed to be integers, then this is determined by designating polynomial coefficients expressed by Equation (14) in general form shown below. Up to 65 such coefficients can be designated; in order, these are called C1, C2, C3, ..., C65, and when the order of the coefficients is expressed by integers j, then a correspondence is established so that the relationship expressed by Equation (15) shown below holds true between the integers m and n that indicate the order numbers of the X coordinates and Y coordinates. Specifically, in the present example, the phase function is defined by the polynomial equation of Equation (16) shown below. Such a definition of the phase function is also the same for tables described later.

$$\sum_{m=0}^{10} \sum_{n=0}^{10} C_{mn} X^m Y^n, \text{ where } C_{mn} = 0 \quad (14)$$

$$j = \frac{(m+n)^2 + m + 3n}{2} \quad (15)$$

$$C1X + C2Y + C3X^2 + c4XY + \ldots + C65Y^{10} \quad (16)$$

With regard to the definition of the anamorphic non-spherical surface 5c used here, this can be defined by expressing the Z-axis coordinate value of a point (x, y) on the curved surface 5c where the optical axis of the curved surface 5c is taken as the Z coordinate axis (i.e., the amount of sag) as shown in Equation (17) below.

$$\frac{CUXx^2 + CUYy^2}{1 + \sqrt{1 - (1+KX)CUX^2x^2 - (1+KY)CUY^2y^2}} + \quad (17)$$

$$AR\{(1-AP)x^2 + (1+AP)y^2\}^2 +$$

$$BR\{(1-BP)x^2 + (1+BP)y^2\}^3 +$$

$$CR\{(1-CP)x^2 + (1+CP)y^2\}^4 +$$

$$DR\{(1-DP)x^2 + (1+DP)y^2\}^5$$

In Equation (17), CUX indicates the curvature radius in the X-axis direction, CUY indicates the curvature radius in the Y-axis direction, KX is a conical constant in the X-axis direction, KY is a conical constant in the Y-axis direction, AR is a fourth-order non-spherical coefficient that is rotationally symmetrical about the Z axis, BR is a sixth-order non-spherical coefficient that is rotationally symmetrical about the Z axis, CR is an eighth-order non-spherical coefficient that is rotationally symmetrical about the Z axis, DR is a tenth-order non-spherical coefficient that is rotationally symmetrical about the Z axis, AP is a rotationally asymmetrical fourth-order non-spherical coefficient, BP is a rotationally asymmetrical sixth-order non-spherical coefficient, CP is a rotationally asymmetrical eighth-order non-spherical coefficient, and DP is a rotationally asymmetrical tenth-order non-spherical coefficient.

Furthermore, with regard to the positional relationship of the respective optical planes in the present concrete example, the absolute positions of the centers of the respective optical planes with the center P0 of the first plane (plane No. 1=symbol P in FIG. 1) taken as the origin (X, Y, Z)=(0, 0, 0), and the amounts of rotation of these planes about the X-axis (values measured with the counterclockwise direction taken as the positive direction), are shown in Table 3 below.

TABLE 3

| Plane No. (symbol) | X coordinate value | Y coordinate value | Z coordinate value | Rotational angle about X axis [degree] |
|---|---|---|---|---|
| 1 (P) | 0.00000 | 0.00000 | 0.00000 | 0.0000 |
| 2 (5a:R4) | 0.00000 | 0.00000 | 13.00000 | 0.0000 |
| 3 (6) | 0.00000 | 0.00000 | 14.70000 | −30.0000 |
| 4 (5a:R3) | 0.00000 | 0.00000 | 13.00000 | 0.0000 |
| 5 (5b:R2) | 0.00000 | 0.00000 | 16.50000 | 0.0000 |
| 6 (5a:R1) | 0.00000 | 0.00000 | 13.00000 | 0.0000 |
| 7 (5c) | 0.00000 | 22.80000 | 13.10522 | 93.1693 |
| 8 (2) | 0.00000 | 29.16123 | 24.93254 | 45.4349 |

With regard to the position of the first light source of the HOE 6 in this concrete example, it is seen from HX1: 0, HY1: $0.214385 \times 10^{+08}$, HZ1: $0.155769 \times 10^{+08}$ that this is the first quadrant of yz coordinates in FIG. 2, that the distance from the origin is $2.65 \times 10^7$ mm, and that the angle measured from the negative direction of the Z-axis is 54 degrees. However, since Hv1 is VIR, this is convergent light, and is actually incident from the opposite direction. Furthermore, since the two light sources of the HOE 6 are defined in air, the distances and angles are corrected for the refractive index and compared in cases where the HOE 6 is in a medium while the image combiner is used in the end-use system.

In the case of this example, since the distances are substantially infinite, no conversion is necessary. Since the distance of this light source is a distance that is close to the virtual image between the virtual image made by the end-use system and the exit pupil, the dominant diffraction wavelength is constant at respective positions within the exit pupil. Instead, the dominant diffraction wavelength shifts according to the angle of view.

Meanwhile, with regard to the angles, the angle of incidence of the first light source with respect to the normal of the HOE is 54° in air. Here, since the light on the optical axis, while the image combiner is used in the end-use system, is incident at an angle of incidence of 30° through a medium with a refractive index of approximately 1.6, this angle is 53.1° when calculated in air. Accordingly, the angle of incidence $\theta 1g$ of the exposure light on the HOE 6 and the angle of incidence $\theta 2$ of the light on the HOE 6 while the image combiner is used in the end-use system are shifted by 0.9°. As a result, the dominant diffraction wavelength at an angle of view of 0° is slightly shifted from the center wavelength of 512 nm which takes only shrinkage into account while the image combiner is used as the end-use system, so that this wavelength approaches the peak wavelength of 516 nm of the green emission spectrum of the light source.

When the diffraction efficiency is calculated for the present concrete example, the dominant wavelengths of the diffraction efficiency of the light rays passing through the respective pupil coordinates Py of −1.5 mm, 0 mm and +1.5 mm at the respective angles of view of −5°, 0° and +5° (angles of view in the Y direction; the angle of view in the X direction is 0°) are as shown in Table 4 below. Here, the pupil coordinate Py is the positional coordinate in the direction of the Y-axis within the exit pupil P in the plane of the page in FIG. 1; the position of Py=0 mm indicates the center P0 of the exit pupil P. Furthermore, in the case of the light rays passing through the pupil coordinate of Py=0 mm, the light rays at all angles of view are chief rays.

TABLE 4

| | Angle of view | | |
|---|---|---|---|
| Pupil coordinate Py | −5° | 0° | +5° |
| −1.5 mm | 529.2 nm | 516.04 nm | 499.56 nm |
| 0 mm | 529.2 nm | 516.04 nm | 499.56 nm |
| +1.5 mm | 529.2 nm | 516.04 nm | 499.56 nm |

Figure 3:
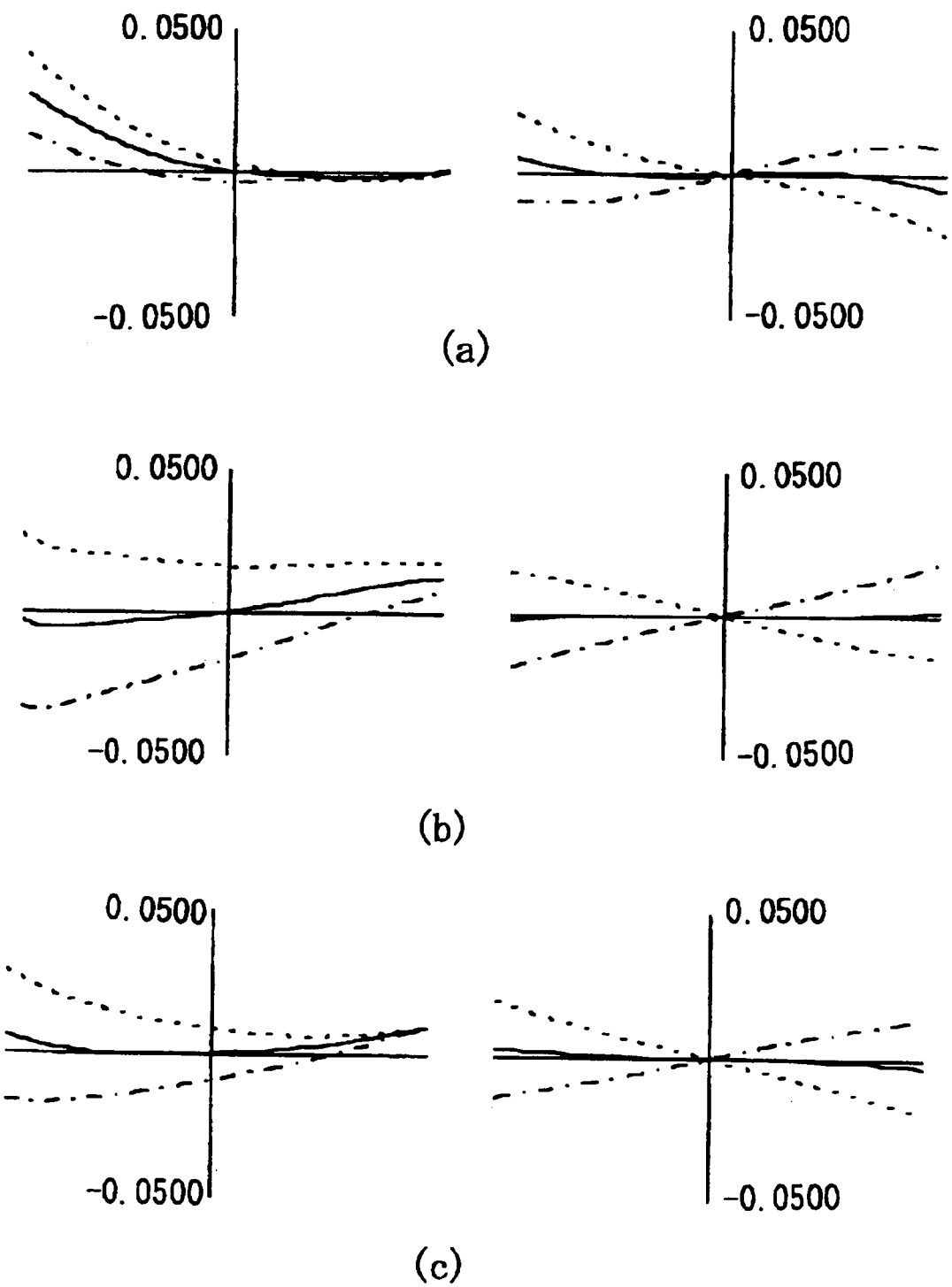
FIG. 3 is a lateral aberration diagram for a concrete example of the first working configuration of the present invention, with FIG. 3(*a*) showing an angle of view of (X, Y)=(0°, +5°), FIG. 3(*b*) showing an angle of view of (X, Y)=(0°, 0°), and FIG. 3(*c*) showing an angle of view of (X, Y)=(0°, −5°), and with the left side of each figure showing the lateral aberration in the direction of the Y-axis and the right side of each figure showing the lateral aberration in the direction of the X axis. Furthermore, the solid lines indicate light with a wavelength of 499.59 nm, the broken lines indicate light with a wavelength of 509.59 nm, and the one-dot chain lines indicate light with a wavelength of 519.2 nm.
Figure 4:
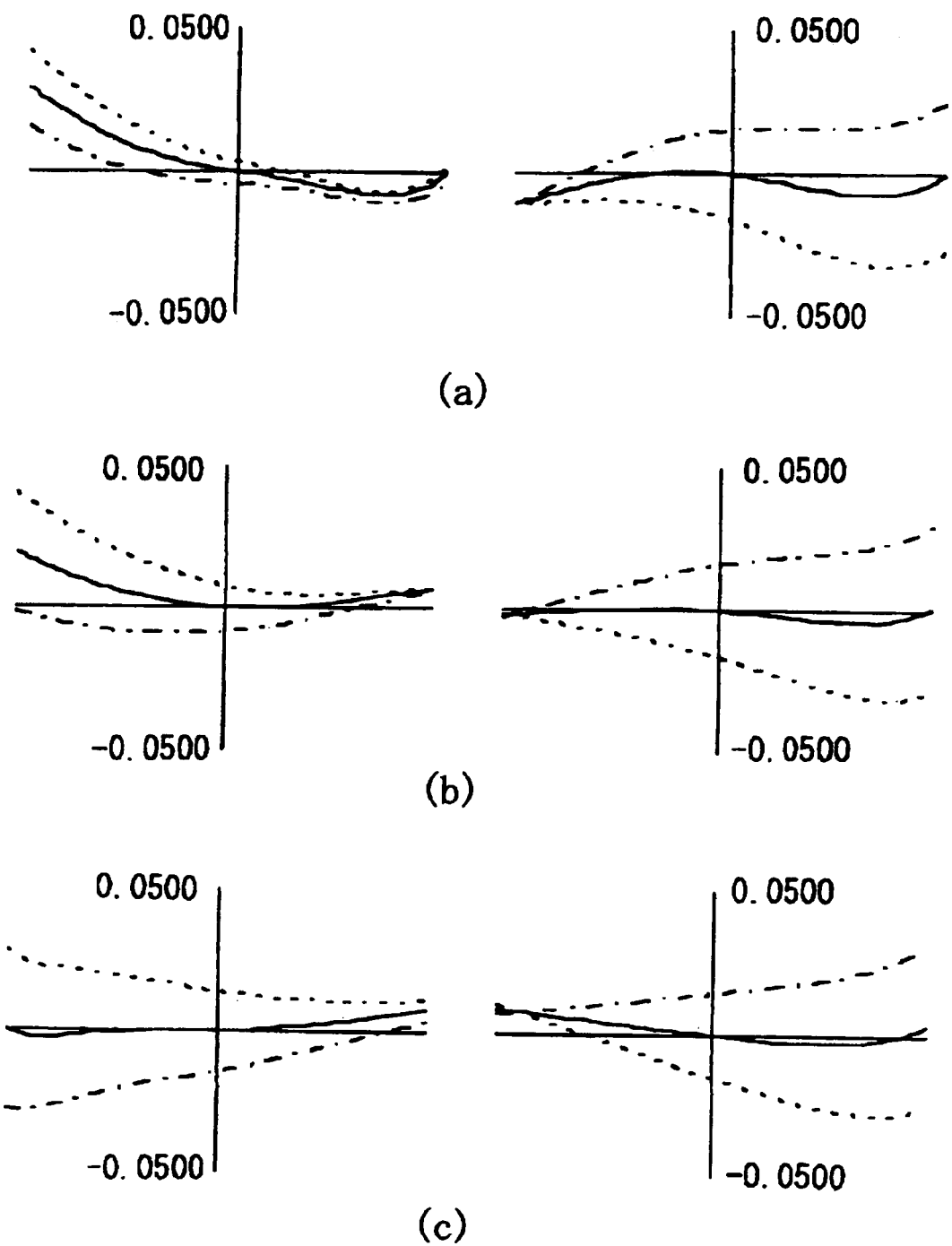
FIG. 4 is another lateral aberration diagram for a concrete example of the first working configuration of the present invention.

Furthermore, lateral aberration diagrams used to express the image focusing performance of the optical system of the present concrete example are shown in FIGS. 3 and 4. In FIGS. 3 and 4, lateral aberration diagrams for light rays of the dominant diffraction wavelength ±10 nm are shown simultaneously in one diagram for each angle of view. It is seen from FIGS. 3 and 4 that there is little chromatic aberration throughout the entire region within the angle of view, so that the image focusing performance is superior.

Figure 5:
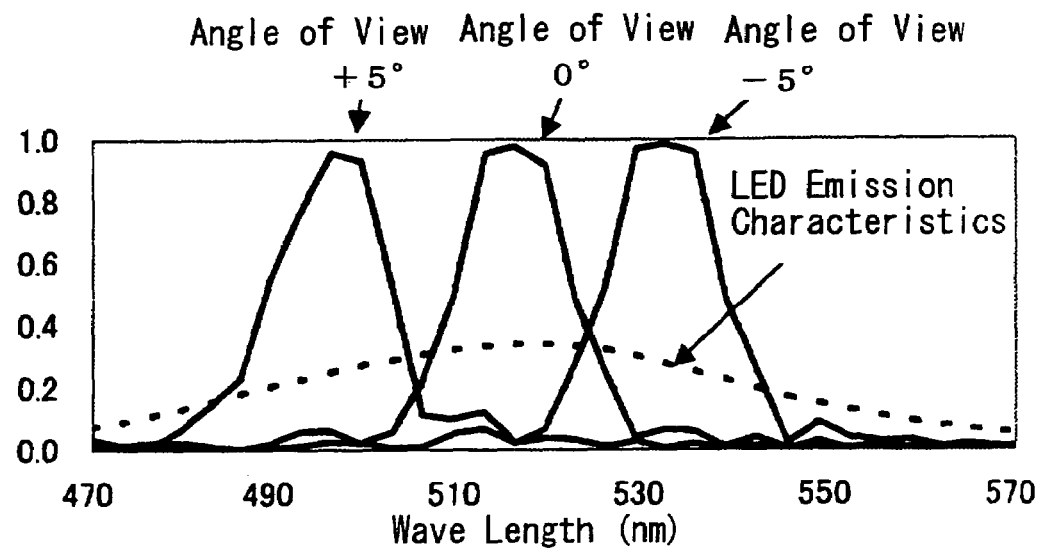
FIG. 5 is a diagram which shows the relationship between diffraction efficiency and wavelength for respective angles of view in a concrete example of the first working configuration of the present invention.
Figure 6:
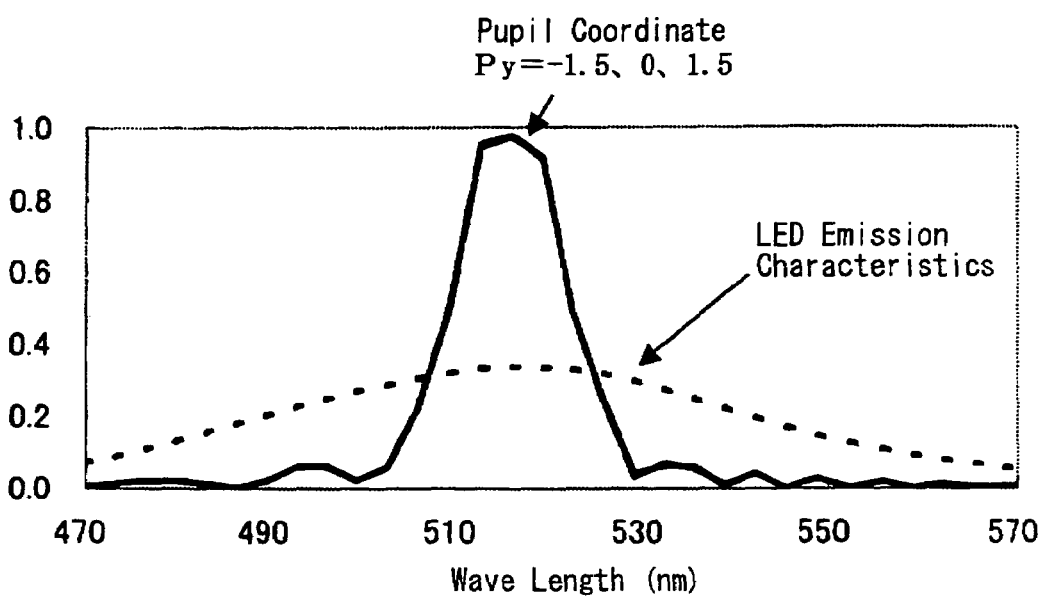
FIG. 6 is a diagram which shows the relationship between diffraction efficiency and wavelength for respective pupil coordinates in a concrete example of the first working configuration of the present invention.

Furthermore, the wavelength characteristics of the diffraction efficiency of the HOE 6 of the present concrete example (characteristics for green light) are shown in FIGS. 5 and 6. FIG. 5 shows the wavelength characteristics of the diffraction efficiency of the chief rays (Py=0 mm) at respective angles of view of −50, 0° and +50 (angles of view in the Y direction; the angle of view in the X direction is 0°). FIG. 6 shows the wavelength characteristics of the diffraction efficiency of the light rays passing through the respective pupil coordinates of −1.5 mm, 0 mm and +1.5 mm at an angle of view of (X, Y)=(0°, 0°). In FIG. 6, the wavelength characteristics for the respective pupil coordinates coincide and overlap. In FIG. 5, it is shown how the dominant diffraction wavelength shifts according to the angle of view, while in FIG. 6, it is shown how the dominant diffraction wavelength is not shifted according to the pupil coordinates.

Figure 7:
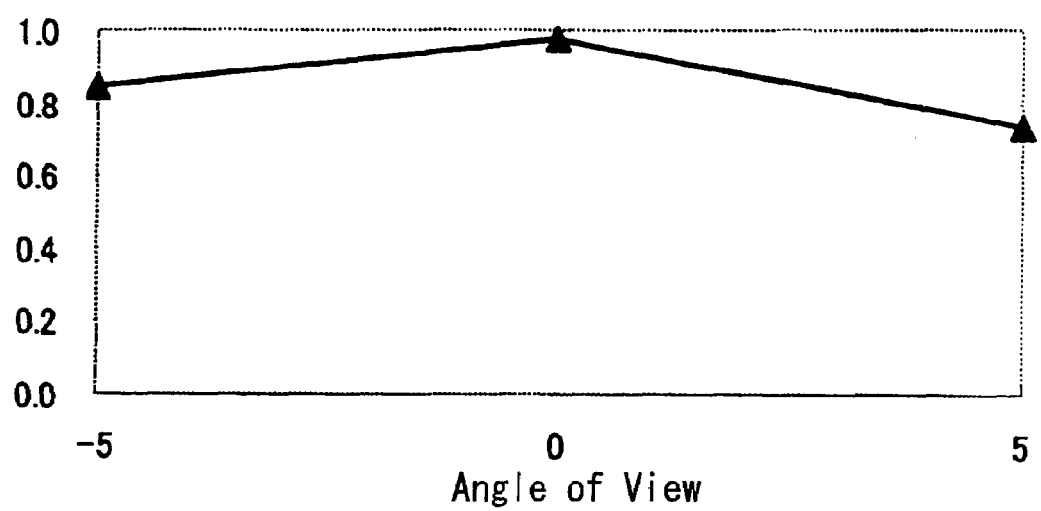
FIG. 7 is a diagram which shows the brightness within the image plane in a concrete example of the first working configuration of the present invention.
Figure 8:
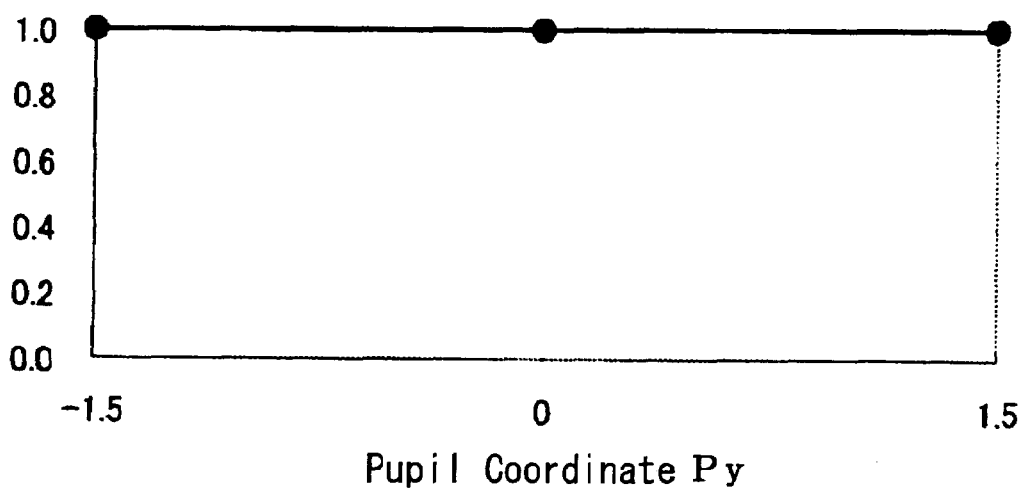
FIG. 8 is a diagram which shows the brightness within the pupil plane in a concrete example of the first working configuration of the present invention.

In FIGS. 5 and 6, the emission spectra of the corresponding G wavelength regions (among the respective wavelength regions of the LED 3 shown in FIG. 27) are also superimposed. In actuality, the quantity of light that reaches the eye of the observer (i.e., the brightness) is a product of these two types of graphs (i.e., a product of the diffraction efficiency and the emission spectrum of the G wavelength region). The brightness distribution within the screen is shown in FIG. 7, and the brightness distribution within the pupil plane is shown in FIG. 8. The respective plotted points in FIG. 7 correspond to the product of the peaks of the diffraction efficiency at the respective angles of view in FIG. 5 and the intensity of the light emitted from the LED 3 at the corresponding peak wavelengths. The respective plotted points in FIG. 8 correspond to the product of the peaks of the diffraction efficiency at the respective pupil coordinates in FIG. 6 and the intensity of the light emitted from the LED 3 at the corresponding peak wavelengths. Furthermore, the vertical axes in FIGS. 7 and 8 indicate the brightness, which is normalized with the maximum brightness taken as 1.

In the present concrete example, the respective ratios $\lambda_{yg}/\lambda_{og}$ of the dominant diffraction wavelength $\lambda_{yg}$ at angles of view of −5° and +5° to the dominant diffraction wavelength $\lambda_{og}$ at the center of the angle of view are 1.026 and 0.968, and are thus less than 0.98 and greater than 1.013, so that the conditions of Equation (10) and Equation (11) described above are satisfied. As a result, the intensity within the pupil plane is flat as shown in FIG. 8.

Furthermore, the differences $|\lambda_{yg} - \lambda_{og}|$ between the dominant diffraction wavelengths in the center and periphery of the angle of view are 13.16 and 16.48, respectively, and the full width at half maximum FWHMg of the light source used in the present concrete example is 60.8 nm; accordingly, when the value of the right side of Equation (12) is calculated, respective values of 0.22 and 0.27 are obtained at angles of view of −5° and +5°, so that the conditions of Equation (12) are satisfied. As a result, a balanced brightness is obtained both within the pupil plane and within the screen, as is shown in FIGS. 7 and 8.

Furthermore, the difference between the angle θ1g of the reference light source and the angle of incidence θ2 of the optical axis of the ray tracing is 0.9°, so that the conditions of Equation (13) are satisfied.

[Second Working Configuration]

Figure 9:
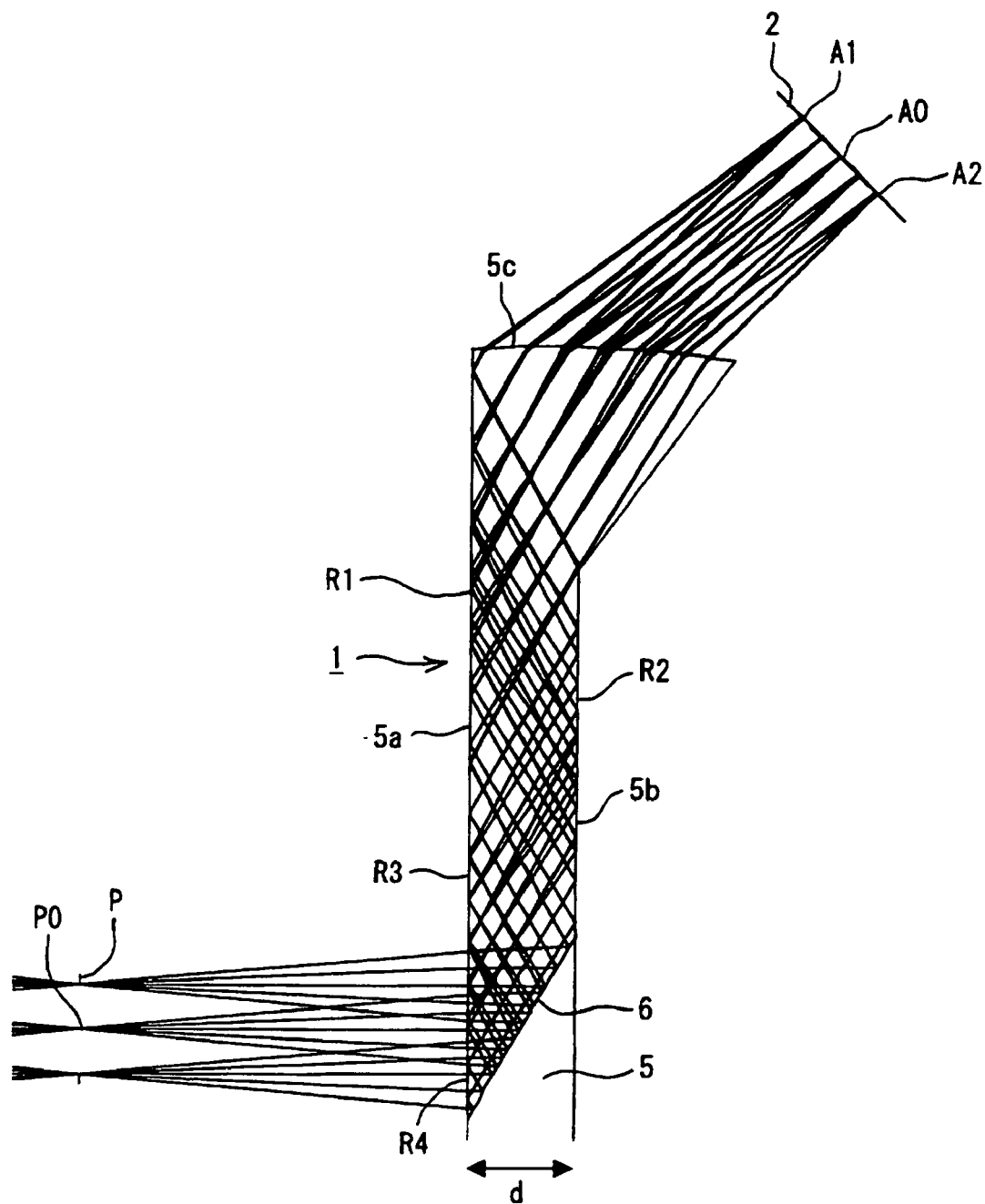
FIG. 9 is a diagram which shows the construction of an image display device constituting a second working configuration of the present invention, and (in schematic terms) the path of the light rays in this image display device.
Figure 9:
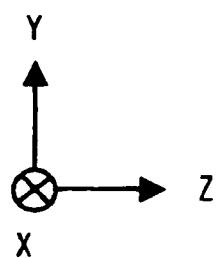

FIG. 9 is a diagram which shows the construction of an image display device constituting a second working configuration of the present invention, and the path of the light rays (only the light rays from the image display element 2) in this image display device. In FIG. 9, elements that are the same as elements in FIG. 1, or that correspond to elements in FIG. 1, are labeled with the same symbols, and a redundant description is omitted. Furthermore, the LED 3 and reflective mirror 4 that constitute the light source are omitted from FIG. 9.

The basic difference between the present working configuration and the first working configuration described above is as follows: in the first working configuration described above, the device was constructed so that the reflective type HOE 6 selectively diffracts and reflects only the G wavelength band component, while in the present working configuration, the device is constructed so that the reflective type HOE 6 selectively diffracts and reflects only the B wavelength band component.

Furthermore, in the present working configuration, since the device is constructed so that the reflective type HOE 6 selectively diffracts and reflects only the B wavelength band component, a B single-color LED which emits only the B wavelength region component in FIG. 27 may be used as the LED 3.

Here, the light rays that are emitted from an arbitrary point on the image display element 2 and that reach the center P0 of the exit pupil P (among the B light that reaches the eye of the user after being emitted from the image display element 2 and diffracted and reflected by the reflective type HOE 6 (i.e., the light of the B wavelength region in FIG. 27)) are called the chief rays with respect to the B wavelength region.

In the present working configuration, if the wavelength at which the diffraction efficiency shows a maximum value when the chief rays with respect to the B wavelength region that are emitted from the center of the display part of the image display element 2 are diffracted and reflected by the reflective type HOE 6 is designated as $\lambda_{ob}$, and if the wavelength at which the diffraction efficiency shows a maximum value when the chief rays with respect to the B wavelength region that are emitted from the peripheral portions of the display part of the image display element 2 in the Y direction in FIG. 9 are diffracted and reflected by the reflective type HOE 6 is designated as $\lambda_{yb}$, then either Equation (18) or Equation (19) shown below is satisfied. Accordingly, in the present working configuration, as will be understood from the content already described, the image quality in cases where the center of the pupil of the eye of the user deviates from the center of the exit pupil of the image combiner can be improved.

$$1.013 < \lambda_{yb}/\lambda_{ob} \quad (18)$$

$$\lambda_{yb}/\lambda_{ob} < 0.98 \quad (19)$$

Furthermore, in the present working configuration, Equation (20) shown below is satisfied. Accordingly, in the present working configuration, as will be understood from the content already described, the amount of the wavelength shift caused by the angle of view with respect to the B wavelength region width of the emission spectrum of the LED 3 is suppressed, so that the danger that a drop in the amount of light will occur in portions of the screen is eliminated.

$$0.2 < |(\lambda_{yb} - \lambda_{ob})/\text{FWHMb}| \quad (20)$$

Furthermore, in the present working configuration, if the angle of incidence (angle calculated in air) on the center of the reflective type HOE 6 from the light source located on the side of the eye of the observer while the image combiner is used in the end-use system (of the two light sources used to expose the reflective type HOE 6 (corresponding the B wavelength region) during manufacture) is designated as θ1b, and if the angle of reflection (angle calculated in air) at the reflective type holographic optical element of the light rays that are emitted from the center of the display part of the image display element 2 and that are directed toward the center P0 of the exit pupil P is designated as θ2, then Equation (21) shown below is satisfied. Accordingly, in the present working configuration, as will be understood from the content already described, the reduction in light at the ends of the angle of view can be balanced in a state that is close to the center distribution.

$$0.8° < |\theta 1b - \theta 2| \quad (21)$$

Here, a concrete example of the present working configuration will be described with reference to FIG. 9. The various optical quantities of this concrete example are as described below.

In the present concrete example, the exposure wavelength of the HOE 6 is set at 476 nm. The diameter of the exit pupil P is 3 mm. The visual field angle in the upward direction within the plane of the page in the figure is 5°. The visual field angle in the downward direction within the plane of the page in the figure is −5°. The visual field angle in the direction of depth of the page is ±6.75°. The screen size in the plane of the page in the figure (i.e., the length between the point A1 and the point A2) is 3.6 mm. The screen size in the direction of depth of the page is 4.8 mm. The thickness d of the plate-form part 5 is 3.5 mm. The plate-form part 5 uses the same material as in the concrete example of the first working configuration described above.

Furthermore, the various quantities used for ray tracing in this concrete example are shown in Table 5 below. The order of the optical planes (order of the plane numbers) runs from the plane of the pupil of the eye of the user (=plane of the exit pupil P of the image combiner 1) to the image display element 2.

TABLE 5

| Plane number (symbol) | Curvature radius | Medium nd | vd | |
|---|---|---|---|---|
| 1 (P) | INFINITY | | | |
| 2 (5a:R4) | INFINITY | 1.596229 | 40.4 | |
| 3 (6) | INFINITY | 1.596229 | 40.4 | Reflective plane |

TABLE 5-continued

Hologram plane:
Definition of two light beams

HV1: REA                HV2: VIR
HX1: $0.000000 \times 10^{+00}$    HY1: $-.243820 \times 10^{+02}$    HZ1: $-.165512 \times 10^{+02}$
HX2: $0.000000 \times 10^{+00}$    HY2: $-.605332 \times 10^{+02}$    HZ2: $-.289129 \times 10^{+02}$ Phase coefficient

| | | | | | |
|---|---|---|---|---|---|
| C2: | $1.7337 \times 10^{+00}$ | C3: | $9.2796 \times 10^{-03}$ | C5: | $-1.5977 \times 10^{-03}$ |
| C7: | $-7.1335 \times 10^{-05}$ | C9: | $2.8492 \times 10^{-04}$ | C10: | $-9.2646 \times 10^{-06}$ |
| C12: | $1.2395 \times 10^{-04}$ | C14: | $5.5187 \times 10^{-05}$ | C16: | $-2.4261 \times 10^{-05}$ |
| C18: | $1.0132 \times 10^{-05}$ | C20: | $-1.2885 \times 10^{-06}$ | C21: | $1.7830 \times 10^{-06}$ |
| C23: | $2.2457 \times 10^{-06}$ | C25: | $5.7068 \times 10^{-07}$ | C27: | $-4.5205 \times 10^{-06}$ |
| C29: | $1.7885 \times 10^{-06}$ | C31: | $2.7316 \times 10^{-07}$ | C33: | $3.8019 \times 10^{-07}$ |
| C35: | $-3.3623 \times 10^{-08}$ | C36: | $1.7243 \times 10^{-08}$ | C38: | $-3.1054 \times 10^{-07}$ |
| C40: | $-4.3523 \times 10^{-07}$ | C42: | $-1.3783 \times 10^{-08}$ | C44: | $4.5950 \times 10^{-07}$ |
| C46: | $-2.8238 \times 10^{-08}$ | C48: | $-1.5580 \times 10^{-08}$ | C50: | $-1.0661 \times 10^{-08}$ |
| C52: | $-2.8648 \times 10^{-08}$ | C54: | $1.1788 \times 10^{-08}$ | C55: | $-2.6416 \times 10^{-10}$ |
| C57: | $2.5009 \times 10^{-08}$ | C59: | $2.8852 \times 10^{-08}$ | C61: | $1.2417 \times 10^{-08}$ |
| C63: | $6.2577 \times 10^{-09}$ | C65: | $-1.4146 \times 10^{-08}$ | | |

| | | | | |
|---|---|---|---|---|
| 4 (5a:R3) | INFINITY | 1.596229 | 40.4 | Reflective plane |
| 5 (5b:R2) | INFINITY | 1.596229 | 40.4 | Reflective plane |
| 6 (5a:R1) | INFINITY | 1.596229 | 40.4 | Reflective plane |
| 7 (5c) | −40.57208 | | | |

Anamorphic non-spherical surface

KY: 0.000000                                KX: 0.000000

Curvature radius in X direction: −20.63634

| | | | | | |
|---|---|---|---|---|---|
| AR: | $0.979301 \times 10^{-05}$ | BR: | $-.785589 \times 10^{-06}$ | CR: | $-.561534 \times 10^{-08}$ |
| DR: | $0.690209 \times 10^{-38}$ | | | | |
| AP: | $-.245366 \times 10^{+01}$ | BP: | $-.272167 \times 10^{+00}$ | CP: | $-.123202 \times 10^{+01}$ |
| DP: | $0.211276 \times 10^{+06}$ | | | | |

| | |
|---|---|
| 8 (2) | INFINITY |

Furthermore, with regard to the positional relationship of the respective optical planes in the present concrete example, the absolute positions of the centers of the respective optical planes with the center of the first plane (plane No. 1=symbol P in FIG. 9) taken as the origin (X, Y, Z)=(0, 0, 0), and the amounts of rotation of these planes about the X-axis (values measured with the counterclockwise direction taken as the positive direction), are shown in Table 6 below.

TABLE 6

| Plane No. (symbol) | X coordinate value | Y coordinate value | Z coordinate value | Rotational angle about X axis [degree] |
|---|---|---|---|---|
| 1 (P) | 0.00000 | 0.00000 | 0.00000 | 0.0000 |
| 2 (5a:R4) | 0.00000 | 0.00000 | 13.00000 | 0.0000 |
| 3 (6) | 0.00000 | 0.00000 | 14.70000 | −30.0000 |
| 4 (5a:R3) | 0.00000 | 0.00000 | 13.00000 | 0.0000 |
| 5 (5b:R2) | 0.00000 | 0.00000 | 16.50000 | 0.0000 |
| 6 (5a:R1) | 0.00000 | 0.00000 | 13.00000 | 0.0000 |
| 7 (5c) | 0.00000 | 22.80000 | 13.10522 | 93.1693 |
| 8 (2) | 0.00000 | 29.16123 | 24.93254 | 45.4349 |

With regard to the position of the first light source of the HOE 6 in this concrete example, it is seen from HX1: 0, HY1: $-0.243820 \times 10^{+02}$, HZ1: $-0.165512 \times 10^{+02}$ that this is the third quadrant of yz coordinates in FIG. 2, that the distance from the origin is 26.469 mm, and that the angle measured from the negative direction of the Z-axis is 55.8 degrees. Furthermore, since HV1 is REA, this is divergent light. Since the two light sources of the HOE 6 are defined in air as in the first working configuration, the distances and angles are corrected for the refractive index and compared in cases where the HOE 6 is in a medium while the image combiner is used in the end-use system.

The plane of the HOE 6 is located at a distance of 14.7 mm from the pupil plane; of this distance, 1.7 mm is located in a medium with a refractive index of approximately 1.6. Accordingly, the length calculated in terms of air is 1.06 mm, so that the distance from the HOE 6 to the pupil plane calculated in terms of air is 14.06 mm. Consequently, the light source distance in this example is approximately twice the distance of the pupil between the virtual image and the pupil.

Meanwhile, with regard to the angles, the angle of incidence of the first light source with respect to the normal of the HOE 6 is 55.8° in air. Here, since the light on the optical axis while the image combiner is used in the end-use system is incident at an angle of incidence of 30° through a medium with a refractive index of approximately 1.6, this angle is 53.1° when calculated in air. Accordingly, the angle of incidence θ1*b* of the exposure light on the HOE 6 and the angle of incidence θ2 of the light on the HOE 6 while it is used in the end-use system are shifted by 2.7°. As a result, the dominant diffraction wavelength at an angle of view of 0° is shifted from the exposure wavelength of 476 nm to 460.3 nm by the shrinkage of the emulsion (assumed to be 3.3%); however, this wavelength is further slightly shifted as a result of the angular deviation of the first light source, so that this wavelength approaches the peak wavelength of 463 nm of the blue emission spectrum of the light source.

When the diffraction efficiency is calculated for the present concrete example, the dominant wavelengths of the diffraction efficiency of the light rays passing through the respective pupil coordinates Py of −1.5 mm, 0 mm and +1.5 mm at the respective angles of view of −5°, 0° and +5° (angles of view in the Y direction; the angle of view in the X direction is 0°) are as shown in Table 7 below. Here, the pupil coordinate Py is the positional coordinate in the direction of the Y-axis within the exit pupil P in the plane of the page in FIG. 9; the position of Py=0 mm indicates the center P0 of the exit pupil P. Furthermore, in the case of the light rays passing through the pupil coordinate of Py=0 mm, the light rays at all angles of view are chief rays.

TABLE 7

|  | Angle of view | | |
| --- | --- | --- | --- |
| Pupil coordinate Py | −5° | 0° | +5° |
| −1.5 mm | 486.38 nm | 469.88 nm | 453.38 nm |
| 0 mm | 479.78 nm | 466.58 nm | 450.08 nm |
| +1.5 mm | 476.48 nm | 459.98 nm | 443.48 nm |

Figure 10:
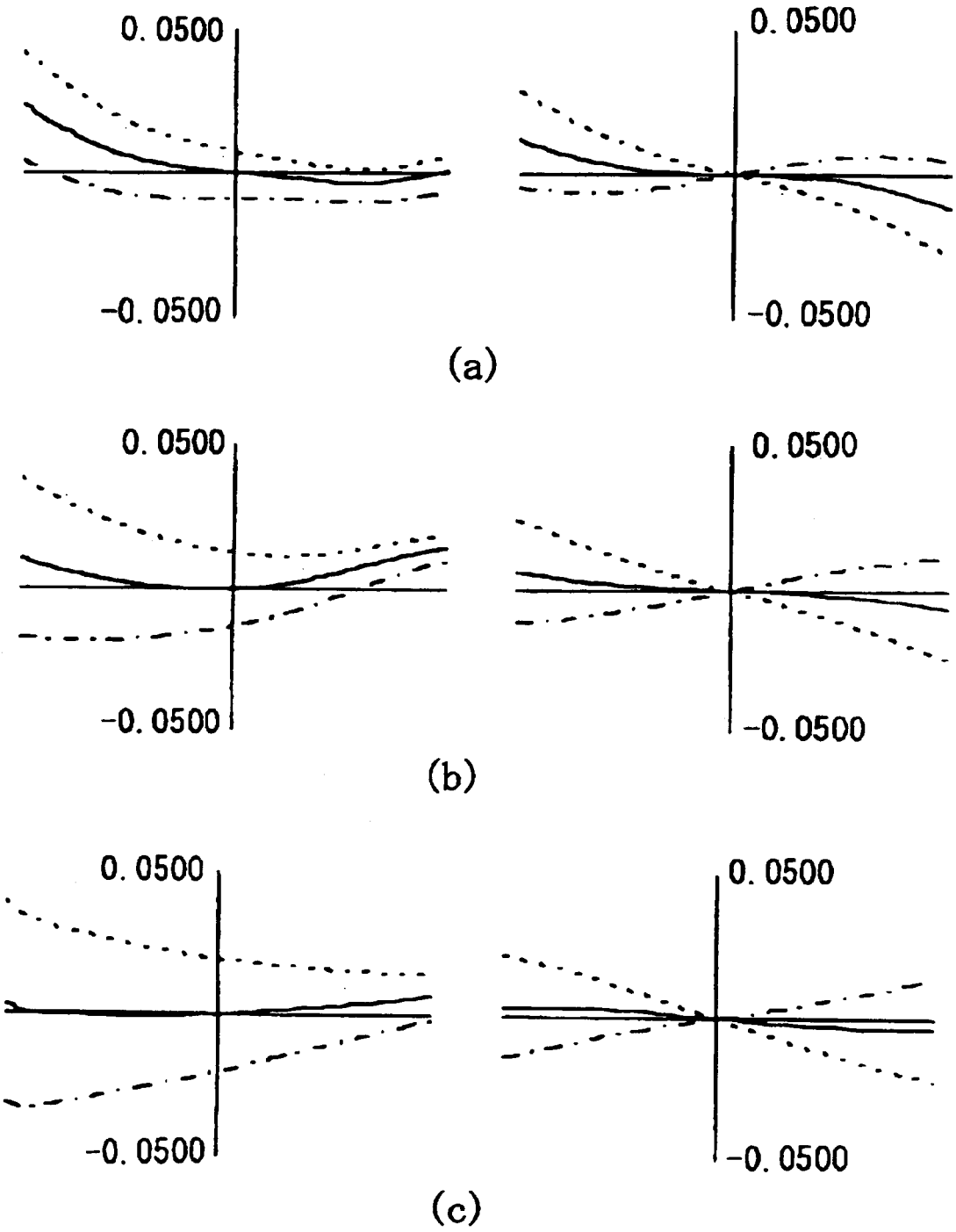
FIG. 10 is a lateral aberration diagram for a concrete example of the second working configuration of the present invention, with FIG. 10(*a*) showing an angle of view of (X, Y)=(0°, +5°), FIG. 10(*b*) showing an angle of view of (X, Y)=(0°, 0°), and FIG. 10(*c*) showing an angle of view of (X, Y)=(0°, −5°), and with the left side of each figure showing the lateral aberration in the direction of the Y-axis and the right side of each figure showing the lateral aberration in the direction of the X axis. Furthermore, the solid lines indicate light with a wavelength of 453.38 nm, the broken lines indicate light with a wavelength of 463.38 nm, and the one-dot chain lines indicate light with a wavelength of 443.38 nm.
Figure 11:
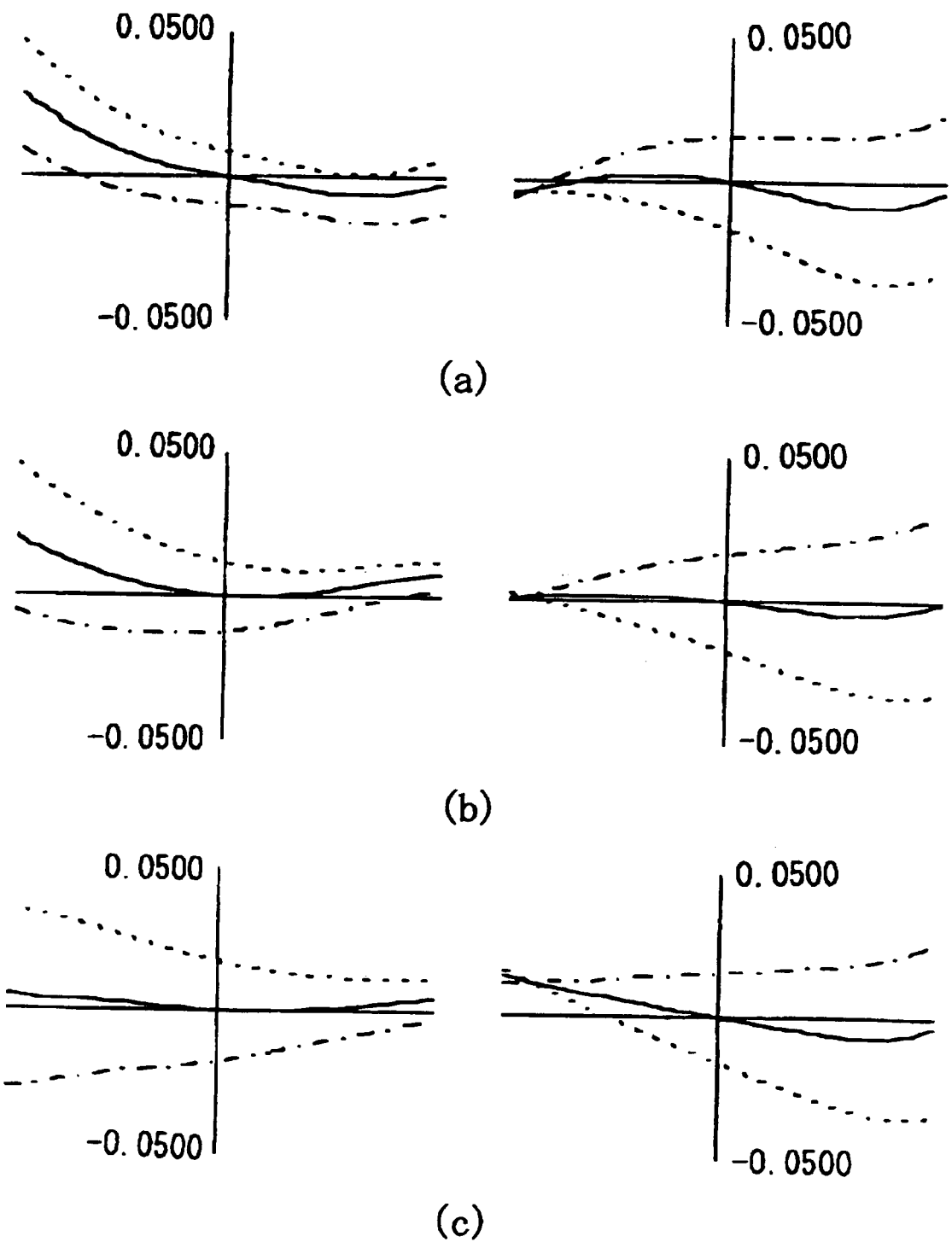
FIG. 11 is another lateral aberration diagram for a concrete example of the second working configuration of the present invention.

Furthermore, lateral aberration diagrams used to express the image focusing performance of the optical system of the present concrete example are shown in FIGS. 10 and 11. In FIGS. 10 and 11, lateral aberration diagrams for light rays of the dominant diffraction wavelength ±10 nm are shown simultaneously in one diagram for each angle of view. It is seen from FIGS. 10 and 11 that there is little chromatic aberration throughout the entire region within the angle of view, so that the image focusing performance is superior.

The LED 3 (not shown in FIG. 9) having three wavelength regions used in the present concrete example is the same as that used in the first working configuration, and has the emission spectrum shown in FIG. 27.

Figure 12:
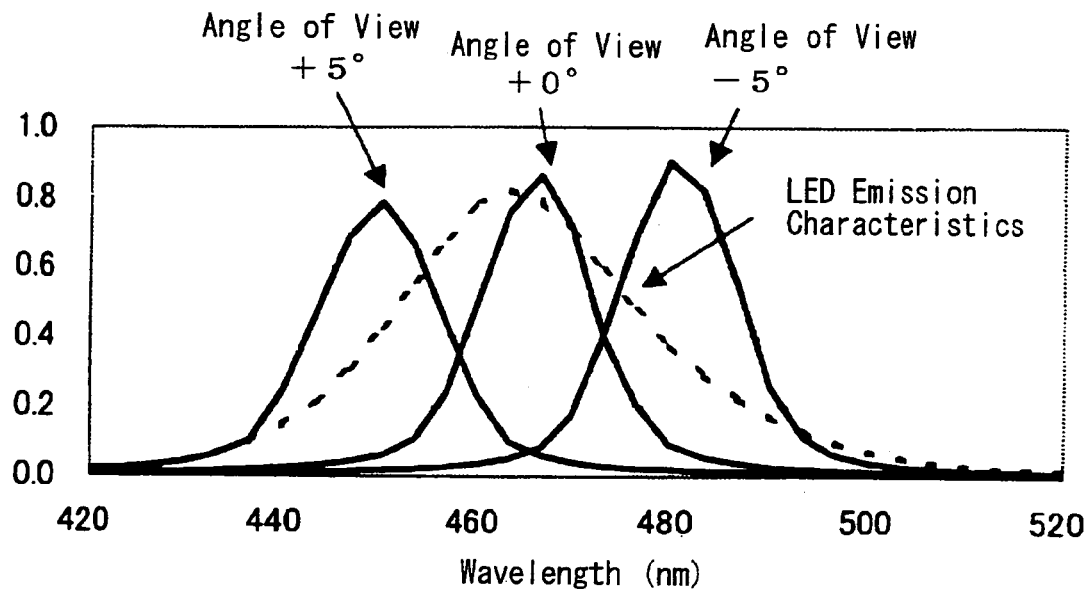
FIG. 12 is a diagram which shows the relationship between diffraction efficiency and wavelength for respective angles of view in a concrete example of the second working configuration of the present invention.
Figure 13:
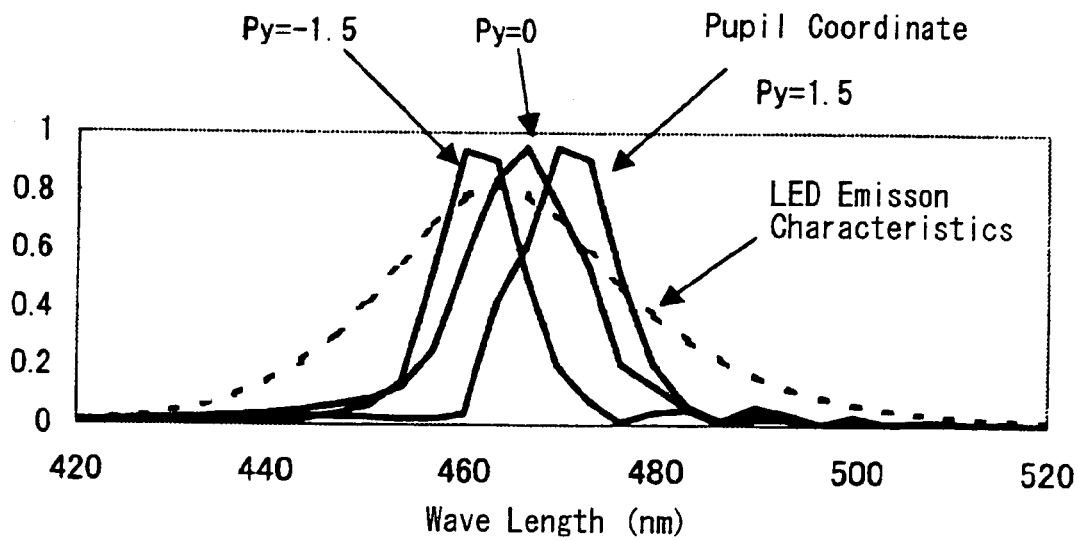
FIG. 13 is a diagram which shows the relationship between diffraction efficiency and wavelength for respective pupil coordinates in a concrete example of the second working configuration of the present invention.

Furthermore, the wavelength characteristics of the diffraction efficiency of the HOE 6 of the present concrete example (characteristics for blue light) are shown in FIGS. 12 and 13. FIG. 12 shows the wavelength characteristics of the diffraction efficiency of the chief rays (Py=0 mm) at respective angles of view of −5°, 0° and +5° (angles of view in the Y direction; the angle of view in the X direction is 0°). FIG. 13 shows the wavelength characteristics of the diffraction efficiency of the light rays passing through the respective pupil coordinates of −1.5 mm, 0 mm and +1.5 mm at an angle of view of (X, Y)=(0°, 0°). In FIG. 12, it is shown how the dominant diffraction wavelength shifts according to the angle of view, while in FIG. 13, it is shown how the dominant diffraction wavelength shifts according to the pupil coordinates. In this concrete example, since the light source is closer to the pupil than in the first working configuration, a diffraction wavelength shift within the pupil plane also occurs.

Figure 14:
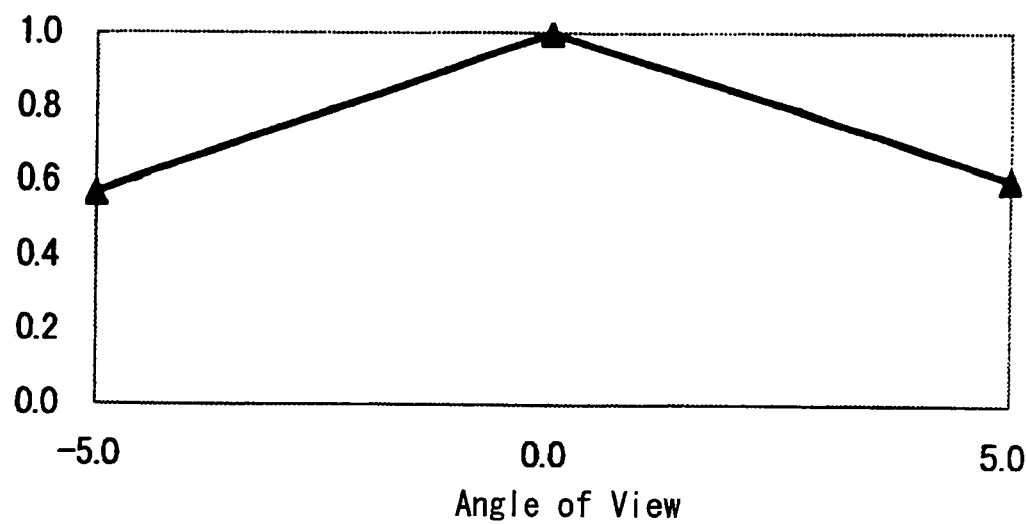
FIG. 14 is a diagram which shows the brightness within the image plane in a concrete example of the second working configuration of the present invention.
Figure 15:
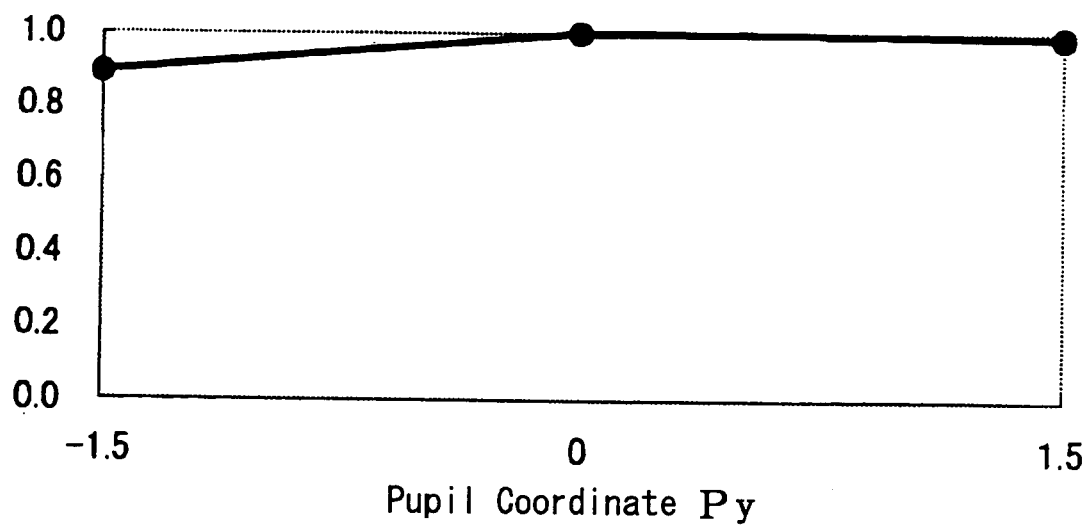
FIG. 15 is a diagram which shows the brightness within the pupil plane in a concrete example of the second working configuration of the present invention.

In FIGS. 12 and 13, the emission spectra of the corresponding B wavelength regions (among the respective wavelength regions of the LED 3 shown in FIG. 27) are also superimposed. In actuality, the quantity of light that reaches the eye of the observer (i.e., the brightness) is a product of these two types of graphs (i.e., a product of the diffraction efficiency and the emission spectrum of the B wavelength region). The brightness distribution within the screen is shown in FIG. 14, and the brightness distribution within the pupil plane is shown in FIG. 15. The respective plotted points in FIG. 14 correspond to the product of the peaks of the diffraction efficiency at the respective angles of view in FIG. 12 and the intensity of the light emitted from the LED 3 at the corresponding peak wavelengths. The respective plotted points in FIG. 15 correspond to the product of the peaks of the diffraction efficiency at the respective pupil coordinates in FIG. 13 and the intensity of the light emitted from the LED 3 at the corresponding peak wavelengths. Furthermore, the vertical axes in FIGS. 14 and 15 indicate the brightness, which is normalized with the maximum brightness taken as 1.

In the present concrete example, the respective ratios $\lambda_{yb}/\lambda_{ob}$ of the dominant diffraction wavelength $\lambda_{yb}$ at angles of view of −5° and +5° to the dominant diffraction wavelength $\lambda_{ob}$ at the center of the angle of view are 1.028 and 0.965, and are thus less than 0.98 and greater than 1.013, so that the conditions of Equation (18) and Equation (19) described above are satisfied. As a result, the intensity within the pupil plane is close to flat as shown in FIG. 15.

Furthermore, the differences $|\lambda_{yb} - \lambda_{ob}|$ between the dominant diffraction wavelengths in the center and periphery of the angle of view are 13.2 and 16.5, respectively, and the full width at half maximum FWHMb of the light source used in the present concrete example is 29 nm; accordingly, when the value of the right side of Equation (20) is calculated, respective values of 0.46 and 0.57 are obtained at angles of view of −5° and +5°, so that the conditions of Equation (20) are satisfied. As a result, a balanced brightness is obtained both within the pupil plane and within the screen, as is shown in FIGS. 14 and 15.

Furthermore, the difference between the angle θ1b of the reference light source and the angle of incidence θ2 of the optical axis of the ray tracing is 2.7°, so that the conditions of Equation (21) are satisfied.

[Third Working Configuration]

Figure 16:
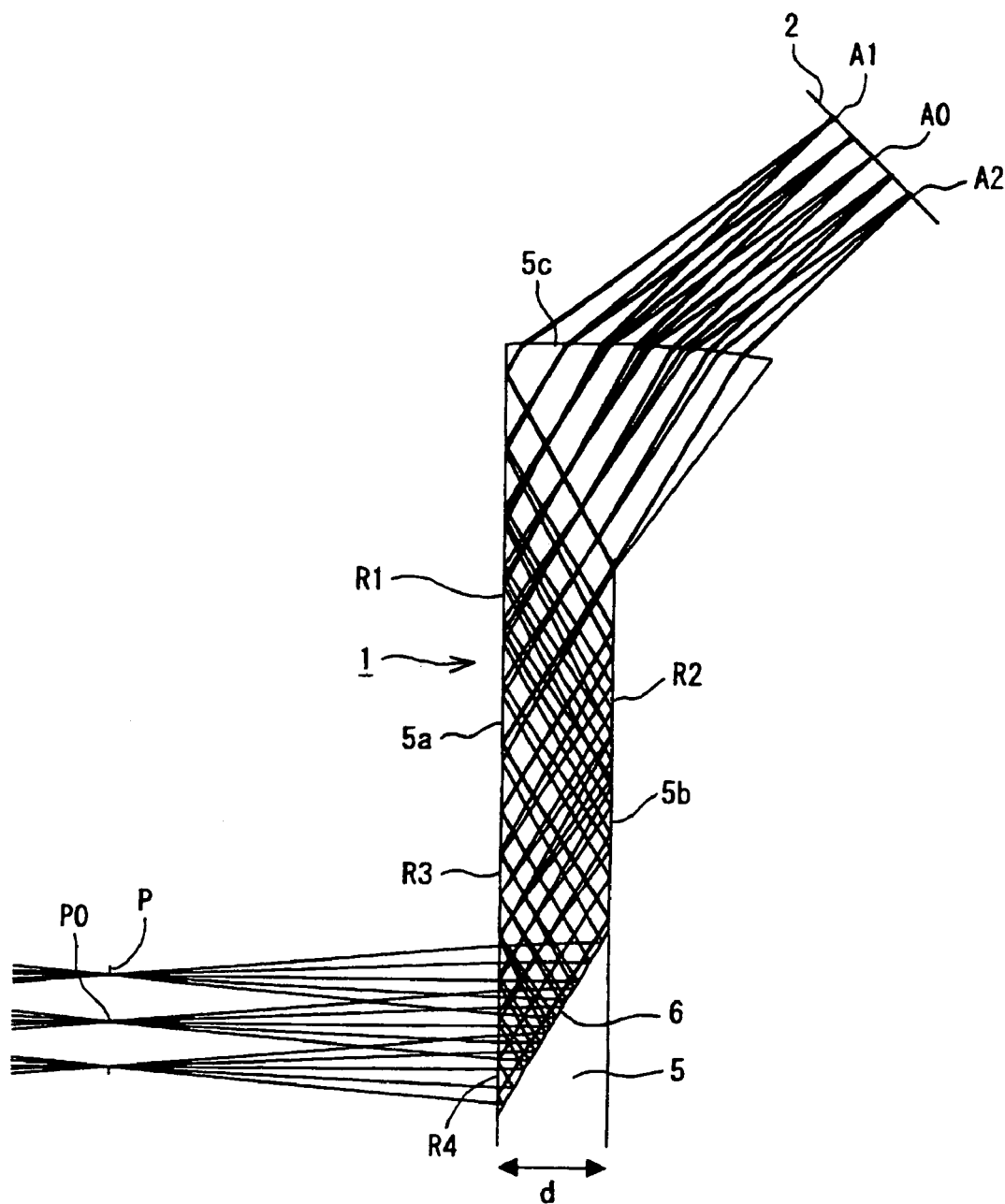
FIG. 16 is a diagram which shows the construction of an image display device constituting a third working configuration of the present invention, and (in schematic terms) the path of the light rays in this image display device.

FIG. 16 is a diagram which shows the construction of an image display device constituting a third working configuration of the present invention, and the path of the light rays (only the light rays from the image display element 2) in this image display device. In FIG. 16, elements that are the same as elements in FIG. 1, or that correspond to elements in FIG. 1, are labeled with the same symbols, and a redundant description is omitted. Furthermore, the LED 3 and reflective mirror 4 that constitute the light source are omitted from FIG. 16.

The basic difference between the present working configuration and the first working configuration described above is as follows: namely, in the first working configuration described above, the device was constructed so that the reflective type HOE 6 selectively diffracts and reflects only the G wavelength band component, while in the present working configuration, the device is constructed so that the reflective type HOE 6 selectively diffracts and reflects only the R wavelength band component.

Furthermore, in the present working configuration, since the device is constructed so that the reflective type HOE 6 selectively diffracts and reflects only the R wavelength band component, an R single-color LED which emits only the R wavelength region component in FIG. 27 may be used as the LED 3.

Here, the light rays that are emitted from an arbitrary point on the image display element 2 and that reach the center P0 of the exit pupil P (among the R light that reaches the eye of the user after being emitted from the image display element 2 and diffracted and reflected by the reflective type HOE 6 (i.e., the light of the R wavelength region in FIG. 27)) are called the chief rays with respect to the R wavelength region.

In the present working configuration, if the wavelength at which the diffraction efficiency shows a maximum value when the chief rays with respect to the R wavelength region that are emitted from the center of the display part of the image display element 2 are diffracted and reflected by the reflective type HOE 6 is designated as $\lambda_{or}$, and if the wavelength at which the diffraction efficiency shows a maximum value when the chief rays with respect to the R wavelength region that are emitted from the peripheral portions of the display part of the image display element 2 in the Y direction in FIG. 16 are diffracted and reflected by the reflective type HOE 6 is designated as $\lambda_{yr}$, then either Equation (22) or Equation (23) shown below is satisfied. Accordingly, in the present working configuration, as will be understood from the content already described, the image quality in cases where the center of the pupil of the eye of the user deviates from the center of the exit pupil of the image combiner can be improved.

$$1.013 < \lambda_{yr}/\lambda_{or} \qquad (22)$$

$$\lambda_{yr}/\lambda_{or} < 0.98 \qquad (23)$$

Furthermore, in the present working configuration, Equation (24) shown below is satisfied. Accordingly, in the present working configuration, as will be understood from the content already described, the amount of the wavelength shift caused by the angle of view with respect to the R wavelength region width of the emission spectrum of the LED 3 is suppressed, so that the danger that a drop in the amount of light will occur in portions of the screen is eliminated.

$$0.2 < |(\lambda_{yr} - \lambda_{or})/\text{FWHMr}| \qquad (24)$$

Furthermore, in the present working configuration, if the angle of incidence (angle calculated in air) on the center of the reflective type HOE 6 from the light source located on the side of the eye of the observer while the image combiner is used in the end-use system (of the two light sources used to expose the reflective type HOE 6 (corresponding the R wavelength region) during manufacture) is designated as $\theta 1r$, and if the angle of reflection (angle calculated in air) at the reflective type holographic optical element of the light rays that are emitted from the center of the display part of the image display element 2 and that are directed toward the center P0 of the exit pupil P is designated as $\theta 2$, then Equation (25) shown below is satisfied. Accordingly, in the present working configuration, as will be understood from the content already described, the reduction in light at the ends of the angle of view can be balanced in a state that is close to the center distribution.

$$0.8° < 51 |\theta 1r - \theta 2| \qquad (25)$$

Here, a concrete example of the present working configuration will be described with reference to FIG. 16. The various optical quantities of this concrete example are as described below.

In the present concrete example, the exposure wavelength of the HOE 6 is set at 647 nm. The diameter of the exit pupil P is 3 mm. The visual field angle in the upward direction within the plane of the page in the figure is 5°. The visual field angle in the downward direction within the plane of the page in the figure is −5°. The visual field angle in the direction of depth of the page is ±6.75°. The screen size in the plane of the page in the figure (i.e., the length between the point A1 and the point A2) is 3.6 mm. The screen size in the direction of depth of the page is 4.8 mm. The thickness d of the plate-form part 5 is 3.5 mm. The plate-form part 5 uses the same material as in the concrete example of the first working configuration described above.

Furthermore, the various quantities used for ray tracing in this concrete example are shown in Table 8 below. The order of the optical planes (order of the plane numbers) runs from the plane of the pupil of the eye of the user (=plane of the exit pupil P of the image combiner 1) to the image display element 2.

TABLE 8

| Plane number (symbol) | Curvature radius | Medium nd | νd | |
|---|---|---|---|---|
| 1 (P) | INFINITY | | | |
| 2 (5a:R4) | INFINITY | 1.596229 | 40.4 | |
| 3 (6) INFINITY | INFINITY | 1.596229 | 40.4 | Reflective plane |

Hologram plane:
Definition of two light beams

HV1: REA
HX1: $0.000000 \times 10^{+00}$
HX2: $0.000000 \times 10^{+00}$

HV2: VIR
HY1: $-.124597 \times 10^{+02}$
HY2: $-.132998 \times 10^{+06}$

HZ1: $-.841764 \times 10^{+01}$
HZ2: $-.516363 \times 10^{+06}$

Phase coefficient

| | | | | | |
|---|---|---|---|---|---|
| C2: | $1.0778 \times 10^{+00}$ | C3: | $1.8026 \times 10^{-02}$ | C5: | $1.7958 \times 10^{-03}$ |
| C7: | $-1.3475 \times 10^{-03}$ | C9: | $-1.2758 \times 10^{-04}$ | C10: | $-3.8516 \times 10^{-05}$ |
| C12: | $1.8068 \times 10^{-04}$ | C14: | $7.4199 \times 10^{-05}$ | C16: | $-1.5243 \times 10^{-05}$ |
| C18: | $6.8532 \times 10^{-06}$ | C20: | $-3.9793 \times 10^{-06}$ | C21: | $1.5435 \times 10^{-06}$ |
| C23: | $1.4019 \times 10^{-06}$ | C25: | $3.3772 \times 10^{-07}$ | C27: | $-4.4250 \times 10^{-06}$ |
| C29: | $1.5818 \times 10^{-06}$ | C31: | $-1.4761 \times 10^{-07}$ | C33: | $4.2293 \times 10^{-07}$ |
| C35: | $3.1500 \times 10^{-08}$ | C36: | $2.4298 \times 10^{-08}$ | C38: | $-2.5636 \times 10^{-07}$ |
| C40: | $-3.8160 \times 10^{-07}$ | C42: | $-4.2124 \times 10^{-09}$ | C44: | $4.6437 \times 10^{-07}$ |
| C46: | $-2.2460 \times 10^{-08}$ | C48: | $-1.0668 \times 10^{-08}$ | C50: | $2.3493 \times 10^{-08}$ |
| C52: | $-3.3721 \times 10^{-08}$ | C54: | $1.1657 \times 10^{-08}$ | C55: | $-3.7867 \times 10^{-10}$ |
| C57: | $1.9619 \times 10^{-08}$ | C59: | $2.6564 \times 10^{-08}$ | C61: | $7.2079 \times 10^{-09}$ |
| C63: | $6.8830 \times 10^{-09}$ | C65: | $-1.7445 \times 10^{-08}$ | | |

TABLE 8-continued

| | | | | |
|---|---|---|---|---|
| 4 (5a:R3) | INFINITY | 1.596229 | 40.4 | Reflective plane |
| 5 (5b:R2) | INFINITY | 1.596229 | 40.4 | Reflective plane |
| 6 (5a:R1) | INFINITY | 1.596229 | 40.4 | Reflective plane |
| 7 (5c) | −40.57208 | | | |

Anamorphic non-spherical surface

KY: 0.000000  KX: 0.000000

Curvature radius in X direction: −20.63634

AR: $0.979301 \times 10^{-05}$  BR: $-.785589 \times 10^{-06}$  CR: $-.561534 \times 10^{-08}$
DR: $0.690209 \times 10^{-38}$
AP: $-.245366 \times 10^{+01}$  BP: $-.272167 \times 10^{+00}$  CP: $-.123202 \times 10^{+01}$
DP: $0.211276 \times 10^{+06}$

| | |
|---|---|
| 8 (2) | INFINITY |

Furthermore, with regard to the positional relationship of the respective optical planes in the present concrete example, the absolute positions of the centers of the respective optical planes with the center of the first plane (plane No. 1=symbol P in FIG. 16) taken as the origin (X, Y, Z)=(0, 0, 0), and the amounts of rotation of these planes about the X-axis (values measured with the counterclockwise direction taken as the positive direction), are shown in Table 9 below.

TABLE 9

| Plane No. (symbol) | X coordinate value | Y coordinate value | Z coordinate value | Rotational angle about X axis [degree] |
|---|---|---|---|---|
| 1 (P) | 0.00000 | 0.00000 | 0.00000 | 0.0000 |
| 2 (5a:R4) | 0.00000 | 0.00000 | 13.00000 | 0.0000 |
| 3 (6) | 0.00000 | 0.00000 | 14.70000 | −30.0000 |
| 4 (5a:R3) | 0.00000 | 0.00000 | 13.00000 | 0.0000 |
| 5 (5b:R2) | 0.00000 | 0.00000 | 16.50000 | 0.0000 |
| 6 (5a:R1) | 0.00000 | 0.00000 | 13.00000 | 0.0000 |
| 7 (5c) | 0.00000 | 22.80000 | 13.10522 | 93.1693 |
| 8 (2) | 0.00000 | 29.16123 | 24.93254 | 45.4349 |

With regard to the position of the first light source of the HOE 6 in this concrete example, it is seen from HX1: 0, HY1: $-0.124597 \times 10^{+02}$, HZ1: $-0.841764 \times 10^{+01}$ that this is the third quadrant of yz coordinates in FIG. 2, that the distance from the origin is 15.04 mm, and that the angle measured from the negative direction of the Z-axis is 56 degrees. Furthermore, since HV1 is REA, this is divergent light. Since the two light sources of the HOE 6 are defined in air as in the first working configuration, the distances and angles are corrected for the refractive index and compared in cases where the HOE 6 is in a medium while the image combiner is used as the end-use system.

The plane of the HOE 6 is located at a distance of 14.7 mm from the pupil plane; of this distance, 1.7 mm is located in a medium with a refractive index of approximately −1.6. Accordingly, the length calculated in terms of air is 1.06 mm, so that the distance from the HOE 6 to the pupil plane calculated in terms of air is 14.06 mm. Consequently, the light source distance in this example is a distance which is such that the light source is close to the pupil between the virtual image and the pupil.

Meanwhile, with regard to the angles, the angle of incidence of the first light source with respect to the normal of the HOE 6 is 56° in air. Here, since the light on the optical axis while the image combiner is used in the end-use system is incident at an angle of incidence of 30° through a medium with a refractive index of approximately 1.6, this angle is 53.1° when calculated in air. Accordingly, the angle of incidence θ1r of the exposure light on the HOE 6 and the angle of incidence θ2 of the light on the HOE 6 while it is used in the end-use system are shifted by 2.9°. As a result, the dominant diffraction wavelength at an angle of view of 0° is shifted from the exposure wavelength of 647 nm to 625.6 nm by the shrinkage of the emulsion (assumed to be 3.3%); however, this wavelength is further slightly shifted as a result of the angular deviation of the first light source.

When the diffraction efficiency is calculated for the present concrete example, the dominant wavelengths of the diffraction efficiency of the light rays passing through the respective pupil coordinates Py of −1.5 mm, 0 mm and +1.5 mm at the respective angles of view of −5°, 0° and +5° (angles of view in the Y direction; the angle of view in the X direction is 0°) are as shown in Table 10 below. Here, the pupil coordinate Py is the positional coordinate in the direction of the Y-axis within the exit pupil P in the plane of the page in FIG. 16; the position of Py=0 mm indicates the center P0 of the exit pupil P. Furthermore, in the case of the light rays passing through the pupil coordinate of Py=0 mm, the light rays at all angles of view are chief rays.

TABLE 10

| | Angle of view | | |
|---|---|---|---|
| Pupil coordinate Py | −5° | 0° | +5° |
| −1.5 mm | 654.32 nm | 644.45 nm | 628.00 nm |
| 0 mm | 644.45 nm | 634.58 nm | 621.42 nm |
| +1.5 mm | 631.29 nm | 621.42 nm | 608.26 nm |

Figure 17:
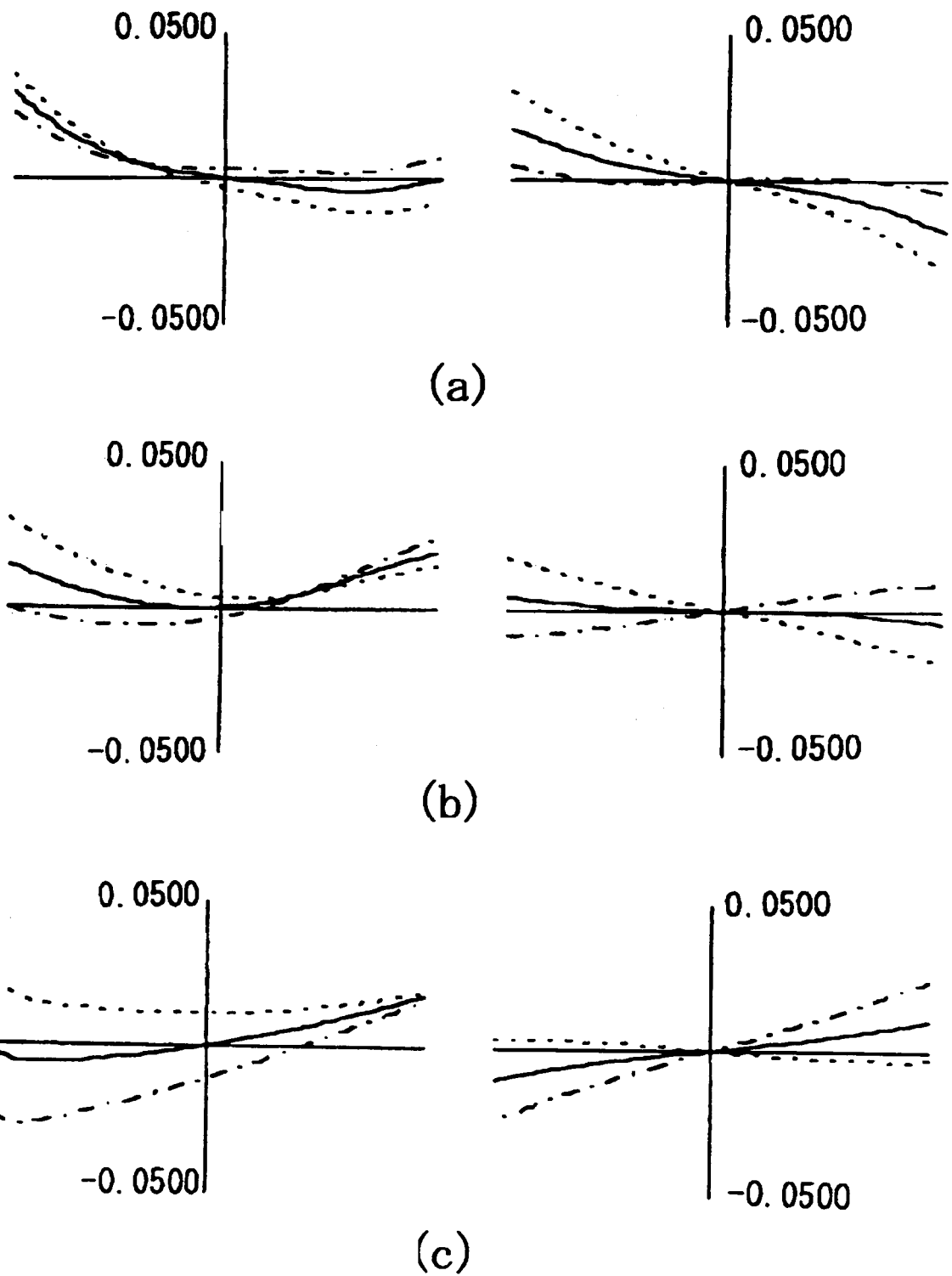
FIG. 17 is a lateral aberration diagram for a concrete example of the third working configuration of the present invention, with FIG. 17(*a*) showing an angle of view of (X, Y)=(0°, +5°), FIG. 17(*b*) showing an angle of view of (X, Y)=(0°, 0°), and FIG. 17(*c*) showing an angle of view of (X, Y)=(0°, −5°), and with the left side of each figure showing the lateral aberration in the direction of the Y-axis and the right side of each figure showing the lateral aberration in the direction of the X axis. Furthermore, the solid lines indicate light with a wavelength of 641.16 nm, the broken lines indicate light with a wavelength of 651.16 nm, and the one-dot chain lines indicate light with a wavelength of 631.16 nm.
Figure 18:
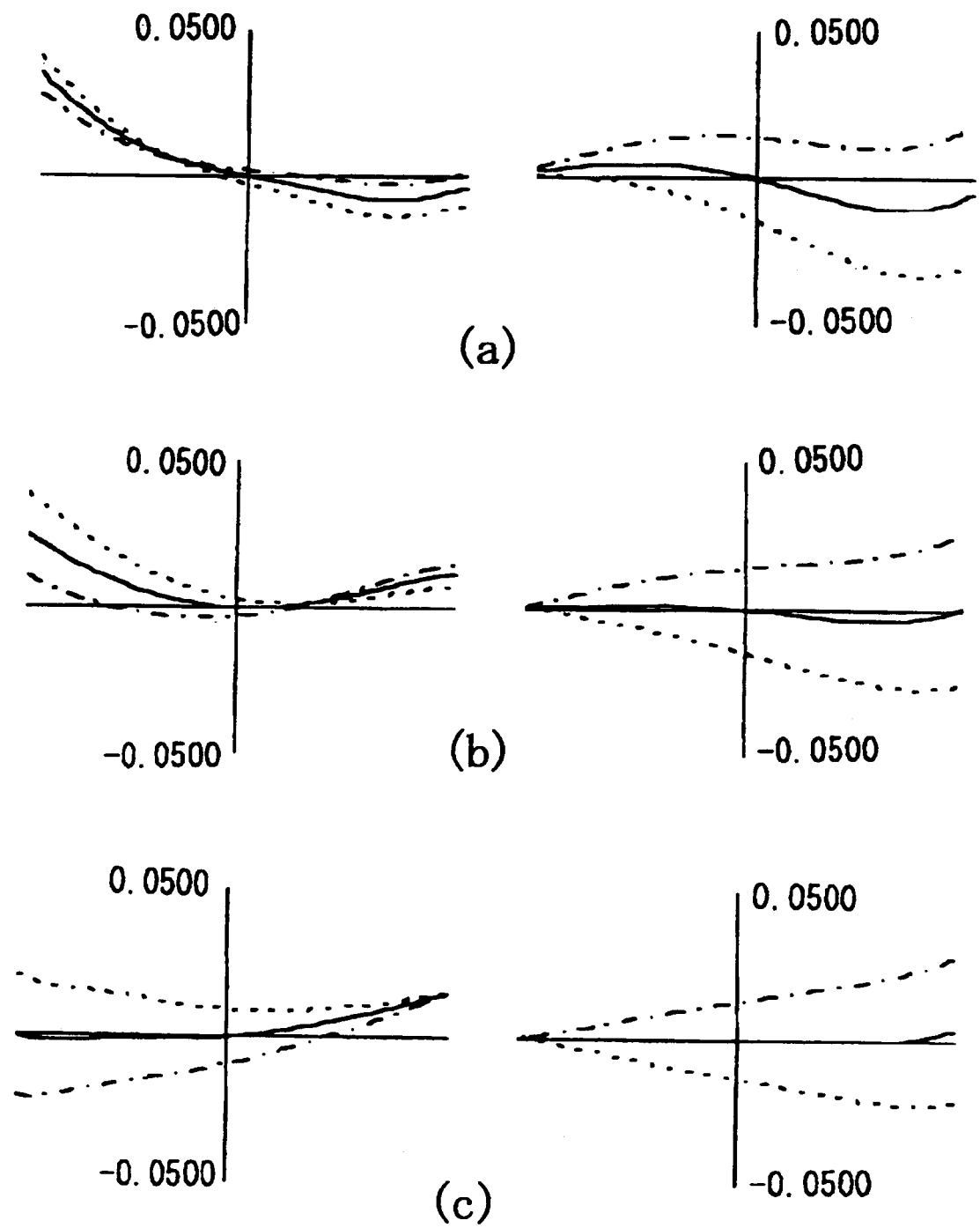
FIG. 18 is another lateral aberration diagram for a concrete example of the third working configuration of the present invention.

Furthermore, lateral aberration diagrams used to express the image focusing performance of the optical system of the present concrete example are shown in FIGS. 17 and 18. In FIGS. 17 and 18, lateral aberration diagrams for light rays of the dominant diffraction wavelength ±10 nm are shown simultaneously in one diagram for each angle of view. It is seen from FIGS. 17 and 18 that there is little chromatic aberration throughout the entire region within the angle of view, so that the image focusing performance is superior.

The LED 3 (not shown in FIG. 16) having three wavelength regions used in the present concrete example is the same as that used in the first working configuration, and has the emission spectrum shown in FIG. 27.

Figure 19:
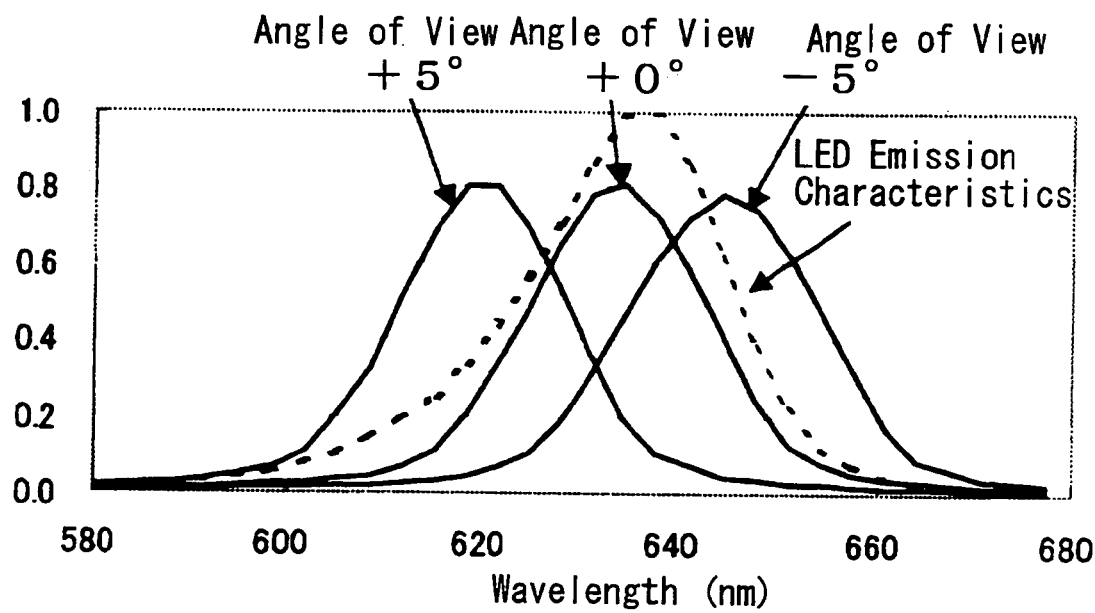
FIG. 19 is a diagram which shows the relationship between diffraction efficiency and wavelength for respective angles of view in a concrete example of the third working configuration of the present invention.
Figure 20:
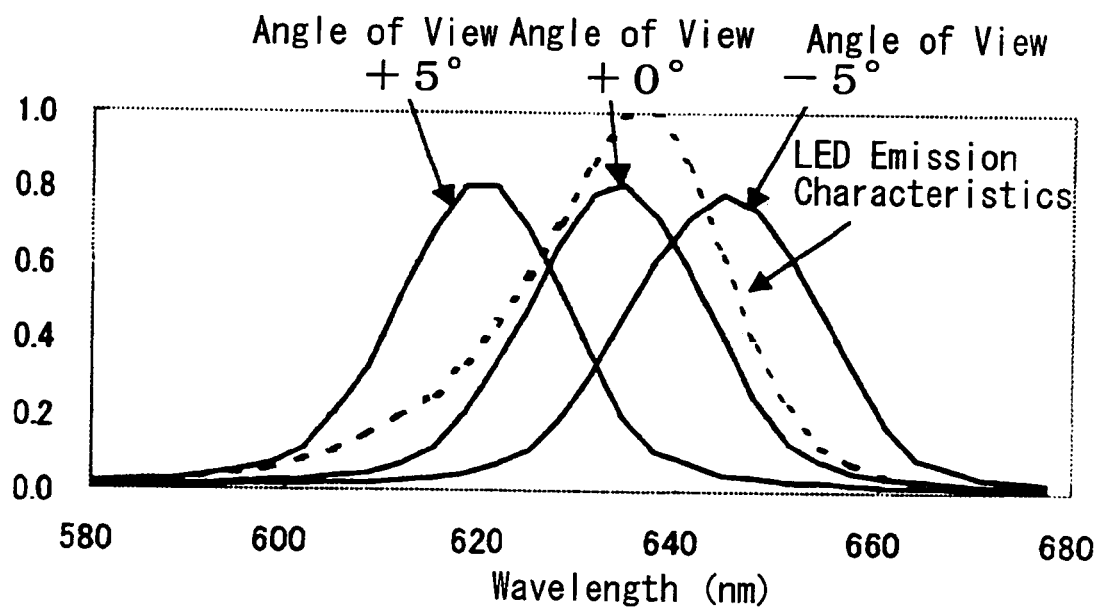
FIG. 20 is a diagram which shows the relationship between diffraction efficiency and wavelength for respective pupil coordinates in a concrete example of the third working configuration of the present invention.

Furthermore, the wavelength characteristics of the diffraction efficiency of the HOE 6 of the present concrete example (characteristics for red light) are shown in FIGS. 19 and 20. FIG. 19 shows the wavelength characteristics of the diffraction efficiency of the chief rays (Py=0 mm) at respective angles of view of −5°, 0° and +5° (angles of view in the Y direction; the angle of view in the X direction is 0°). FIG. 20 shows the wavelength characteristics of the diffraction efficiency of the light rays passing through the respective pupil coordinates of −1.5 mm, 0 mm and +1.5 mm at an angle of view of (X, Y)=(0°, 0°). In FIG. 19, it is shown how the dominant diffraction wavelength shifts according to the angle of view, while in FIG. 20, it is shown how the dominant diffraction wavelength shifts according to the pupil coordinates. In this concrete example, since the light source is closer to the pupil than in the first working configuration, a diffraction wavelength shift within the pupil plane also occurs.

Figure 21:
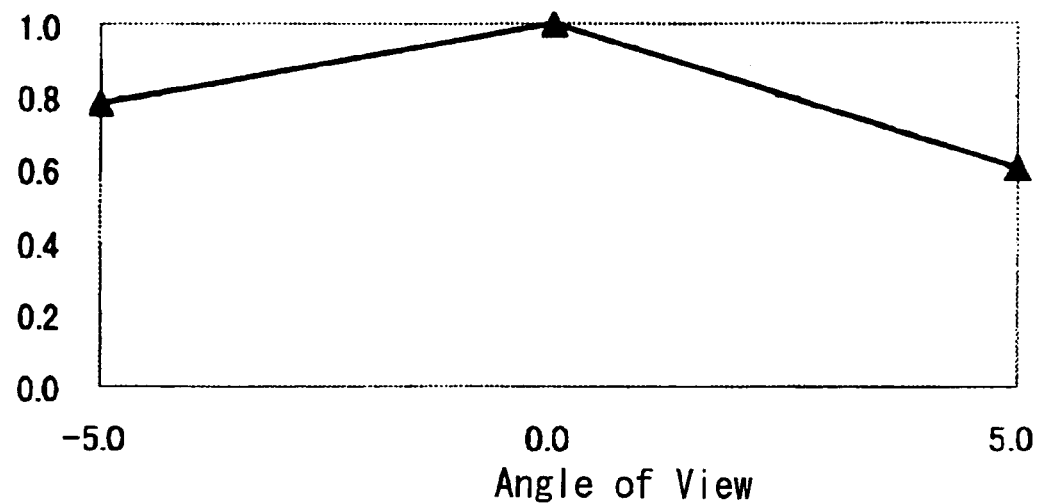
FIG. 21 is a diagram which shows the brightness within the image plane in a concrete example of the third working configuration of the present invention.
Figure 22:
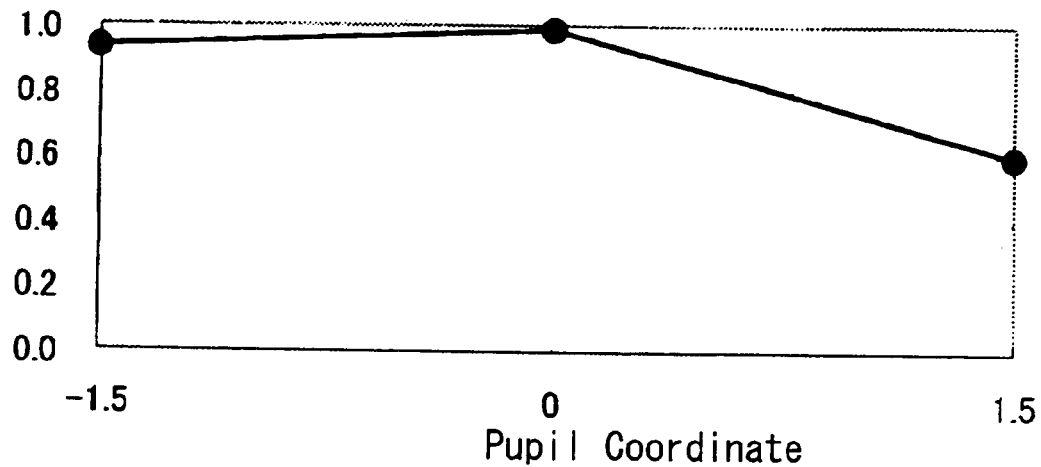
FIG. 22 is a diagram which shows the brightness within the pupil plane in a concrete example of the third working configuration of the present invention.

In FIGS. 19 and 20, the emission spectra of the corresponding R wavelength regions (among the respective wavelength regions of the LED 3 shown in FIG. 27) are also superimposed. In actuality, the quantity of light that reaches the eye of the observer (i.e., the brightness) is a product of these two types of graphs (i.e., a product of the diffraction efficiency and the emission spectrum of the R wavelength region). The brightness distribution within the screen is shown in FIG. 21, and the brightness distribution within the pupil plane is shown in FIG. 22. The respective plotted points in FIG. 21 correspond to the product of the peaks of the diffraction efficiency at the respective angles of view in FIG. 19 and the intensity of the light emitted from the LED 3 at the corresponding peak wavelengths. The respective plotted points in FIG. 22 correspond to the product of the peaks of the diffraction efficiency at the respective pupil coordinates in FIG. 20 and the intensity of the light emitted from the LED 3 at the corresponding peak wavelengths.

In the present concrete example, the respective ratios $\lambda_y/\lambda_{or}$ of the dominant diffraction wavelength $\lambda_{yr}$ at angles of view of −5° and +50 to the dominant diffraction wavelength $\lambda_{or}$ at the center of the angle of view are 1.016 and 0.979, and are thus less than 0.98 and greater than 1.013, so that the conditions of Equation (22) and Equation (23) described above are satisfied. As a result, the intensity within the pupil plane is close to flat as shown in FIG. 22.

Furthermore, the differences $|\lambda_{yr}-\theta_{or}|$ between the dominant diffraction wavelengths in the center and periphery of the angle of view are 9.87 and 13.16, respectively, and the full width at half maximum FWHMr of the light source used in the present concrete example is 23 nm; accordingly, when the value of the right side of Equation (24) is calculated, respective values of 0.43 and 0.57 are obtained at angles of view of −50 and +5°, so that the conditions of Equation (24) are satisfied. As a result, a balanced brightness is obtained both within the pupil plane and within the screen, as is shown in FIGS. 21 and 22.

Furthermore, the difference between the angle θ1r of the reference light source and the angle of incidence θ2 of the optical axis of the ray tracing is 2.9°, so that the conditions of Equation (25) are satisfied.

[Fourth Working Configuration]

Although this is not shown in the figures, the image display device constituting a fourth working configuration of the present invention is a device in which the image display device constituting a concrete example of the first working configuration described above is modified as follows.

The only difference between the image display device of the present working configuration and the image display device of the concrete example of the first working configuration described above is the construction of the reflective type HOE 6. In the present working configuration, the reflective type HOE 6 is an HOE in which the reflective type HOE of the concrete example of the first working configuration described above (G reflective type HOE), the reflective type HOE of the concrete example of the second working configuration described above (B reflective type HOE) and the reflective type HOE of the concrete example of the third working configuration described above (R reflective type HOE) are superimposed in three layers. Furthermore, as in the first working configuration described above, the LED 3 used in the present working configuration is also an LED which has three wavelength regions, and which has the emission spectrum shown in FIG. 27.

When the light of the three wavelength regions from this LED 3 passes through the image display element 2, the single display unit of the image display element may be spatially divided into three parts so that dots respectively corresponding to R, G and B are formed, and so that corresponding images are displayed, or this display unit may be divided in terms of time so that images respectively corresponding to R, G and B are switched and displayed (for example) every ¹/₆₀ second, and so that the timing of the light emission of the three wavelength regions of the LED is synchronized with this. Furthermore, the image information of the respective wavelength regions is subjected to a diffraction effect and an image focusing effect by the corresponding layers of the HOE, and full-color images are obtained by additive color mixing after this light is conducted to the pupil of the observer.

Figure 23:
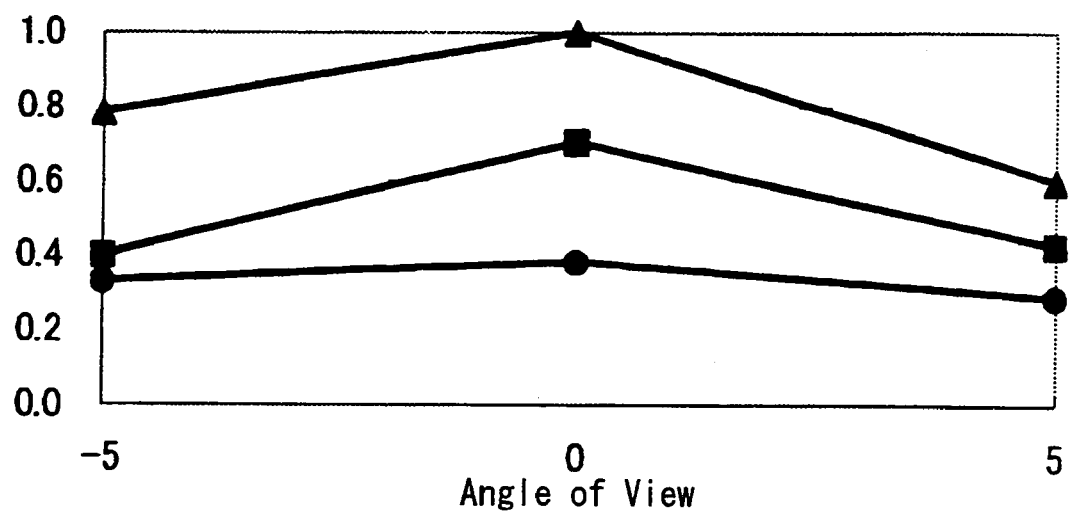
FIG. 23 is a diagram which shows the brightness within the image plane of an image display device constituting a fourth working configuration of the present invention, for respective colors.
Figure 24:
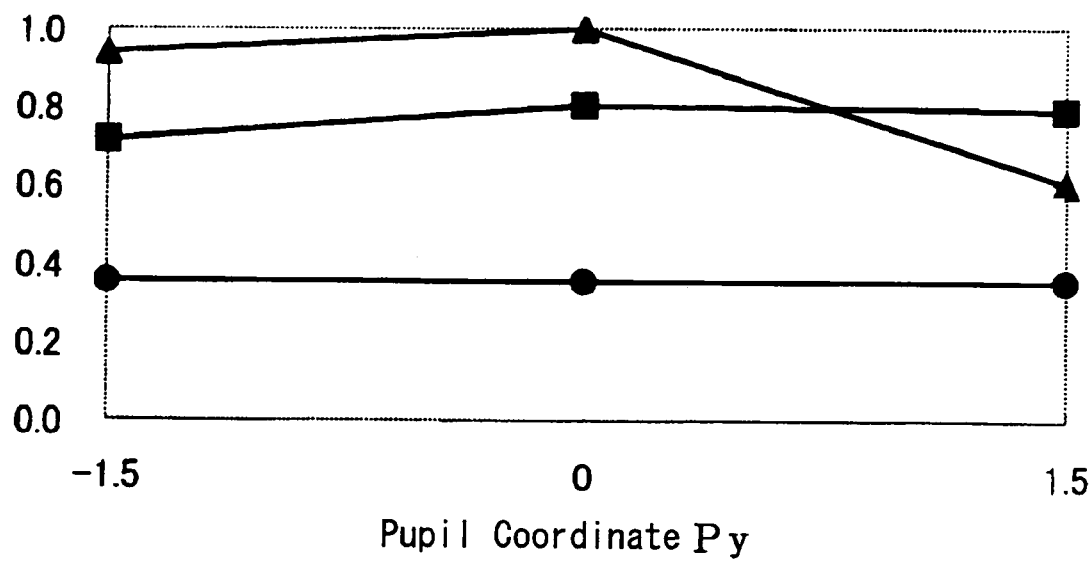
FIG. 24 is a diagram which shows the brightness within the pupil plane of an image display device constituting a fourth working configuration of the present invention, for respective colors.
Figure 25:
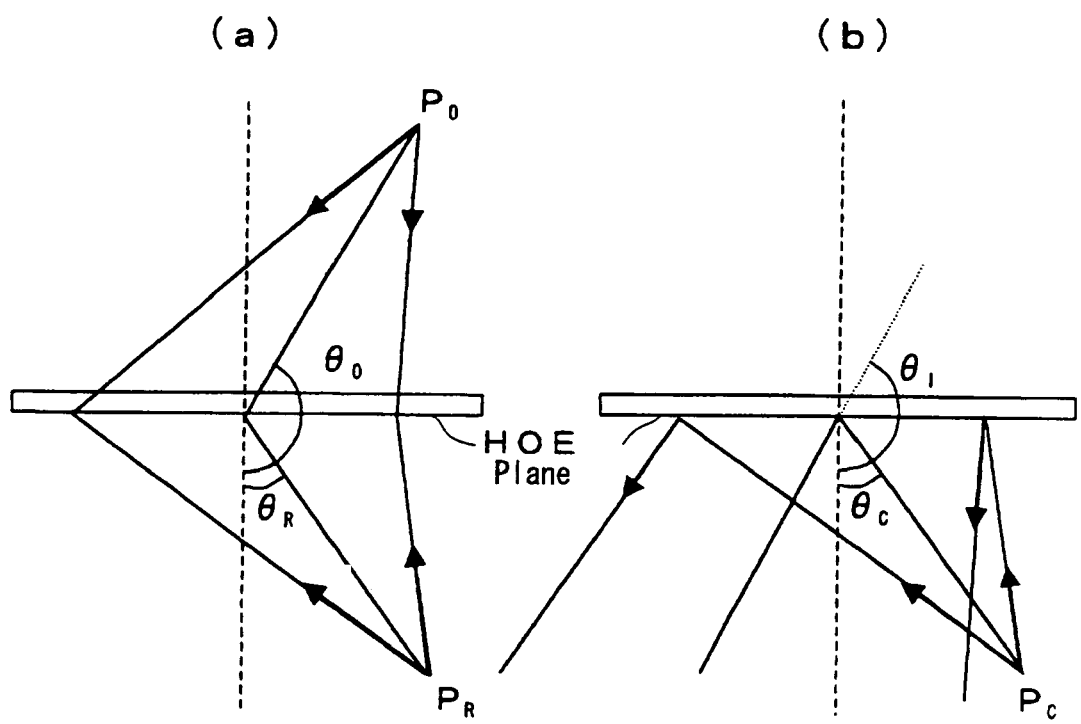
FIG. 25 is an explanatory diagram of the Bragg condition.
Figure 26:
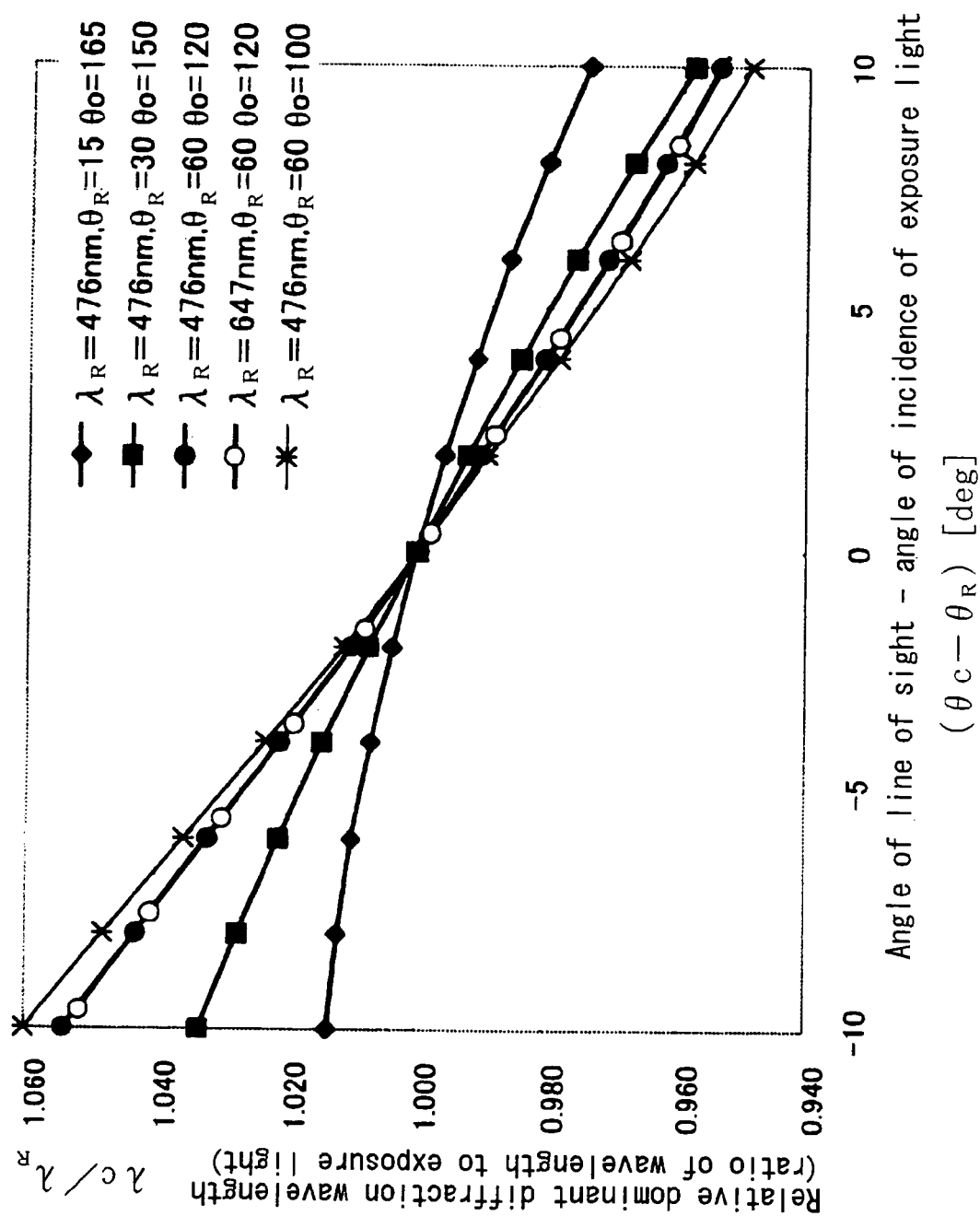
FIG. 26 is a diagram which shows the relationship of the variation (shift) in the dominant diffraction wavelength to the variation in the angle of incidence on the reflective type holographic optical element.

The brightness characteristics in the image plane and the brightness characteristics in the pupil plane of the reflective type HOE 6 used in the present working configuration, i.e., a reflective type HOE which has a structure in which the reflective type HOEs of the concrete examples of the first through third working configurations are superimposed are respectively shown in FIGS. 23 and 24. In FIGS. 23 and 24, the vertical axes show the brightness, which is the product of the diffraction efficiency and light emission intensity of the LED; these values are normalized with the brightest value being taken as 1.

As is seen from FIG. 23, since the ratios of the three colors are substantially the same within the screen, observation with a good color balance is possible throughout the entire region of the image. Furthermore, as is seen from FIG. 24, with regard to the pupil plane, a reduction in red light is seen in the direction in which the pupil coordinate Py is positive; however, blue and green are substantially flat. Accordingly, there is merely some variation in the degree of redness with respect to movements of the eye of the observer; there is no abrupt decrease in brightness.

Respective working configurations of the present invention, and concrete examples of these working configurations, were described above. However, the present invention is not limited to these working configurations or concrete examples.

For instance, the respective working configurations described above were examples in which a head-mounted image display device was constructed using the image combiner of the present invention. However, the respective image combiners 1 used in the respective working configurations described above could also be constructed so as to allow mounting on the ocular lens parts of camera view finders, microscopes and binoculars, or these image combiners could also be incorporated into cameras, microscopes, binoculars, or the like.

Furthermore, the respective working configurations described above were examples in which the present invention was applied to a see-through type head-mounted image display device; however, the present invention can also be applied to image display devices that are not of the see-through type. In this case, the image display devices of the respective working configurations described above can be constructed so that light from the outside world is not incident on the image combiner 1. In such a case, since the part constituting the image combiner 1 does not superimpose two images, this part cannot be called an image combiner; instead, this part constitutes a light conducting part that conducts light from the image display element 2 to the eye of the user. In this case, the lower portion of the plate-form part (portion below the HOE 6) in the image combiner 1 may be removed. For example, such an image display device that is not of the see-through type can be installed inside the flipper part of a portable telephone in the same manner as in the case of Japanese Patent Application Kokai No. 2001-264682.

The invention claimed is:

1. An image combiner comprising a reflective type holographic optical element, wherein the image combiner superimposes light from outside on light from an image display unit that emits light having wavelength region components respectively extending before and after at least one peak wavelength, wherein:
    a wavelength $\lambda_o$ and a wavelength $\lambda_y$ are different,
    where $\lambda_o$ is a wavelength at which a diffraction efficiency of the reflective type holographic optical element has a maximum value in the wavelength region in the vicinity of one peak wavelength for chief rays that are emitted from a center of a display part of the image display unit and diffracted by the reflective type holographic optical element, and
    where $\lambda_y$ is a wavelength at which the diffraction efficiency has a maximum value in the wavelength region in the vicinity of said one peak wavelength for chief rays that are emitted from peripheral portions of the display part and diffracted by the reflective type holographic optical element.

2. The image combiner according to claim 1, wherein one of the following equations is satisfied:

$$1.013 < \lambda_y/\lambda_O, \text{ and} \quad (i)$$

$$\lambda_y/\lambda_o < 0.98. \quad (ii)$$

3. The image combiner according to claim 2, wherein the following equation is satisfied:

$$0.2 < |(\lambda_y-\lambda_o)/\text{FWHM}|,$$

where FWHM is a full width at half maximum of said one peak wavelength of the light emitted from the image display unit.

4. The image combiner according to claim 3, wherein the following equation is satisfied:

$$0.8° < |\theta1-\theta2|,$$

where $\theta1$ is an angle of incidence (angle calculated in air) on a center of the reflective type holographic optical element from a light source that is located on a side of an observer while the reflective type holographic optical element is used in an end-use system among two light sources used to expose the reflective type holographic optical element corresponding to said one wavelength region during manufacture of the reflective type holographic optical element, and
    where $\theta2$ is an angle of reflection (angle calculated in air) at the reflective type holographic optical element of the light rays that are emitted from the center of the display part of the image display unit and directed toward a center of an exit pupil of the image combiner.

5. The image combiner according to claim 2, wherein the following equation is satisfied:

$$0.8° < |\theta1-\theta2|,$$

where $\theta1$ is an angle of incidence (angle calculated in air) on a center of the reflective type holographic optical element from a light source that is located on a side of an observer while the reflective type holographic optical element is used in an end-use system among two light sources used to expose the reflective type holographic optical element corresponding to said one wavelength region during manufacture of the reflective type holographic optical element, and
    where $\theta2$ is an angle of reflection (angle calculated in air) at the reflective type holographic optical element of the light rays that are emitted from the center of the display part of the image display unit and directed toward a center of an exit pupil of the image combiner.

6. An image display device comprising:
    the image combiner according to claim 2; and
    the image display unit;
    wherein at least a part of the image display device containing the image combiner is mounted on a user during use.

7. The image combiner according to claim 1, wherein the following equation is satisfied:

$$0.2 < |(\lambda_y-\lambda_o)/\text{FWHM}|,$$

where FWHM is a full width at half maximum of said one peak wavelength of the light emitted from the image display unit.

8. The image combiner according to claim 3, wherein the following equation is satisfied:

$$0.8° < |\theta1-\theta2|,$$

where $\theta1$ is an angle of incidence (angle calculated in air) on a center of the reflective type holographic optical element from a light source that is located on a side of an observer while the reflective type holographic optical element is used in an end-use system among two light sources used to expose the reflective type holographic optical element corresponding to said one wavelength region during manufacture of the reflective type holographic optical element, and
    where $\theta2$ is an angle of reflection (angle calculated in air) at the reflective type holographic optical element of the light rays that are emitted from the center of the display part of the image display unit and directed toward a center of an exit pupil of the image combiner.

9. An image display device comprising:
    the image combiner according to claim 7; and
    the image display unit;
    wherein at least a part of the image display device containing the image combiner is mounted on a user during use.

10. The image combiner according to claim 1, wherein the following equation is satisfied:

$$0.80 < |\theta1-\theta2|,$$

where θ1 is an angle of incidence (angle calculated in air) on a center of the reflective holographic optical element from a light source that is located on a side of an observer while the reflective type holographic optical element is used in an end-use system among two light sources used to expose the reflective type holographic optical element corresponding to said one wavelength region during manufacture of the reflective type holographic optical element, and where θ2 is an angle of reflection (angle calculated in air) at the reflective type holographic optical element of the light rays that are emitted from the center of the display part of the image display unit and directed toward a center of an exit pupil of the image combiner.

11. An image display device comprising:
the image combiner according to claim 10; and
the image display unit;
wherein at least a part of the image display device containing the image combiner is mounted on a user during use.

12. An image display device comprising:
the image combiner according to claim 1; and
the image display, unit;
wherein at least a part of the image display device containing the image combiner is mounted on a user during use.

13. An image display device comprising:
an image display unit that emits light having wavelength region components respectively extending before and after at least one peak wavelength; and
a light conducting part, which conducts light from the image display unit to an eye of a user, and which comprises a reflective type holographic optical element;
wherein:
a wavelength $\lambda_o$ and a wavelength $\lambda_y$ are different,
where $\lambda_o$ is a wavelength at which a diffraction efficiency of the reflective type holographic optical element has a maximum value in the wavelength region in the vicinity of one peak wavelength for chief rays that are emitted from a center of a display part of the image display unit and diffracted by the reflective type holographic optical element, and
where $\lambda_y$ is a wavelength at which the diffraction efficiency has a maximum value in the wavelength region in the vicinity of said one peak wavelength for chief rays that are emitted from peripheral portions of the display part and diffracted by the reflective type holographic optical element.

14. The image display device according to claim 13, wherein one of the following equations is satisfied:

$$1.013 < \lambda_y/\lambda_o, \text{ and} \quad (i)$$

$$\lambda_y/\lambda_o < 0.98. \quad (ii)$$

15. The image display device according to claim 14, wherein the following equation is satisfied:

$$0.2 < |(\lambda_y - \lambda_o)/\text{FWHM}|,$$

where FWHM is a full width at half maximum of said one peak wavelength of the light emitted from the image display unit.

16. The image display device according to claim 15, wherein the following equation is satisfied:

$$0.8° < |\theta 1 - \theta 2|,$$

where θ1 is an angle of incidence (angle calculated in air) on a center of the reflective type holographic optical element from a light source that is located on a side of an observer while the reflective type holographic optical element is used in an end-use system among two light sources used to expose the reflective type holographic optical element corresponding to said one wavelength region during manufacture of the reflective type holographic optical element, and where θ2 is an angle of reflection (angle calculated in air) at the reflective type holographic optical element of the light rays that are emitted from the center of the display part of the image display unit and directed toward a center of an exit pupil of the image combiner.

17. The image display device according to claim 14, wherein the following equation is satisfied:

$$0.8° < |\theta 1 - \theta 2|,$$

where θ1 is an angle of incidence (angle calculated in air) on a center of the reflective type holographic optical element from a light source that is located on a side of an observer while the reflective type holographic optical element is used in an end-use system among two light sources used to expose the reflective type holographic optical element corresponding to said one wavelength region during manufacture of the reflective type holographic optical element, and where θ2 is an angle of reflection (angle calculated in air) at the reflective type holographic optical element of the light rays that are emitted from the center of the display part of the image display unit and directed toward a center of an exit pupil of the image combiner.

18. The image display device according to claim 13, wherein the following equation is satisfied: where $$0.2 < |(\lambda_y - \lambda_o)/\text{FWHM}|,$$

where FWHM is a full width at half maximum of said one peak wavelength of the light emitted from the image display unit.

19. The image display device according to claim 18, wherein the following equation is satisfied:

$$0.8° < |\theta 1 - \theta 2|,$$

where θ1 is an angle of incidence (angle calculated in air) on a center of the reflective type holographic optical element from a light source that is located on a side of an observer while the reflective type holographic optical element is used in an end-use system among two light sources used to expose the reflective holographic optical element corresponding to said one wavelength region during manufacture of the reflective type holographic optical element, and where θ2 is an angle of reflection (angle calculated in air) at the reflective type holographic optical element of the light rays that are emitted from the center of the display part of the image display unit and directed toward a center of an exit pupil of the image combiner.

20. The image display device according to claim 13, wherein the following equation is satisfied:

$$0.8° < |\theta 1 - \theta 2|,$$

where θ1 is an angle of incidence (angle calculated in air) on a center of the reflective type holographic optical element from a light source that is located on a side of an observer while the reflective type holographic optical element is used in an end-use system among two light sources used to expose the reflective type holographic optical element corresponding to said one wavelength region during manufacture of the reflective type holographic optical element, and where θ2 is an angle of reflection (angle calculated in air) at the reflective type holographic optical element of the light rays that are emitted from the center of the display part of the image display unit and directed toward a center of an exit pupil of the image combiner.

* * * * *